United States Patent
Higgins

(10) Patent No.: US 9,565,403 B1
(45) Date of Patent: Feb. 7, 2017

(54) VIDEO PROCESSING SYSTEM

(75) Inventor: Robert Paul Higgins, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1058 days.

(21) Appl. No.: 13/101,906

(22) Filed: May 5, 2011

(51) Int. Cl.
 H04N 5/225 (2006.01)
 H04N 7/18 (2006.01)
 H04N 5/917 (2006.01)
 H04N 1/00 (2006.01)
 G06T 7/00 (2006.01)

(52) U.S. Cl.
 CPC ............. H04N 7/188 (2013.01); G06T 7/004 (2013.01); H04N 1/00042 (2013.01); H04N 5/917 (2013.01)

(58) Field of Classification Search
 CPC ...... G06K 9/00771; G06K 9/34; G06K 9/342; G06K 9/346; G06T 7/004; G06T 7/0079; G06T 7/2006; G01S 7/7864; G01S 7/7865; H04N 1/00042; H04N 5/917; H04N 7/188
 See application file for complete search history.

(56) References Cited

U.S. PATENT DOCUMENTS

| | | | | |
|---|---|---|---|---|
| 6,970,183 B1 * | 11/2005 | Monroe | ............... | G08B 7/062 348/143 |
| 7,454,037 B2 | 11/2008 | Higgins | | |
| 7,751,651 B2 | 7/2010 | Oldroyd | | |
| 8,527,445 B2 * | 9/2013 | Karins | ............... | G06N 7/005 706/16 |
| 2001/0035907 A1 * | 11/2001 | Broemmelsiek | ...... | G01S 3/7864 348/169 |
| 2004/0125877 A1 * | 7/2004 | Chang | ............... | G06F 17/30787 375/240.28 |
| 2005/0271251 A1 * | 12/2005 | Russell | ............... | G06K 9/00288 382/103 |
| 2005/0275721 A1 * | 12/2005 | Ishii | ............... | G06T 7/2053 348/159 |
| 2009/0015671 A1 * | 1/2009 | Addy | ............... | H04N 7/181 348/143 |

* cited by examiner

*Primary Examiner* — Christopher Findley
(74) *Attorney, Agent, or Firm* — Yee & Associates, P.C.

(57) ABSTRACT

A method and apparatus for processing images. A sequence of images is received from a sensor system. A number of objects is present in the sequence of images. Information about the number of objects is identified using the sequence of images and a selection of a level of reduction of data from different levels of reduction of data. A set of images from the sequence of images is identified using the selection of the level of reduction of data. The set of images and the information about the number of objects are represented in data. An amount of the data for the sequence of images is based on the selection of the level of reduction of data.

24 Claims, 16 Drawing Sheets

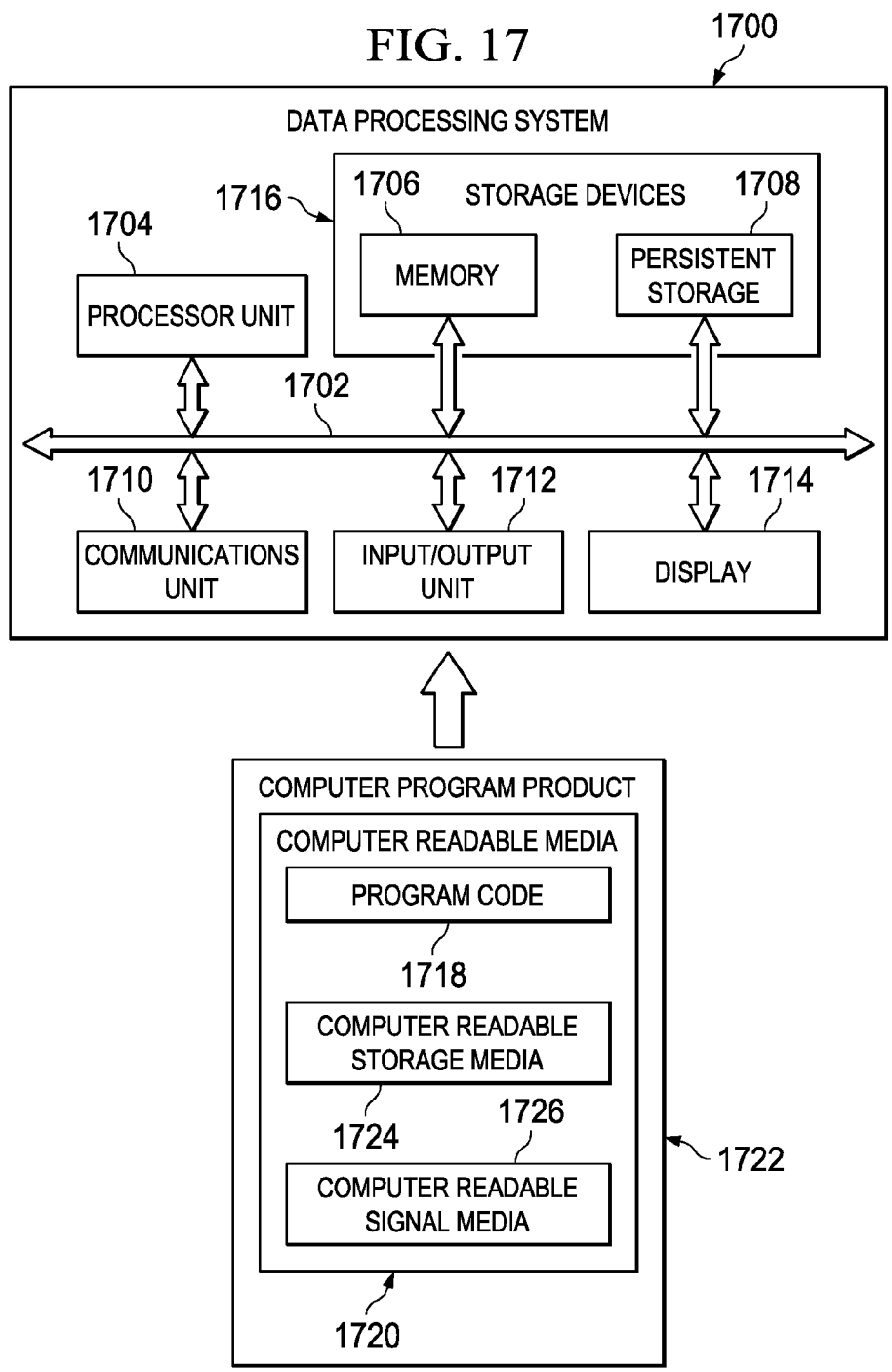

VIDEO PROCESSING SYSTEM

BACKGROUND INFORMATION

1. Field

The present disclosure relates generally to an image and, in particular, to images generated by cameras as video. Still more particularly, the present disclosure relates to a method and apparatus for processing the images and sending the images and information identified using the images over a wireless communications link.

2. Background

Cameras are often used to obtain information about objects, such as vehicles and people. In particular, cameras are used to generate video about objects of interest. For example, a camera on an unmanned aerial vehicle generates video during flight of the unmanned aerial vehicle. This video may also be referred to as a video data stream. The video data stream comprises images. The unmanned aerial vehicle may send this video data stream over a wireless communications link to a control station for review. The control station may be on the ground or on-board another mobile platform, such as an airborne command post.

Typically, the video data stream is compressed prior to being sent to the control station. For example, the video data may be compressed using currently-available compression techniques, such as MPEG-2, MPEG-4, E.264, and/or other suitable types of compression techniques. These currently-available compression techniques reduce the bandwidth needed for sending the video data stream to the control station over the wireless communications link. Bandwidth may be a limiting factor when sending a video data stream over the wireless communications link.

Therefore, it would be advantageous to have a method and apparatus that takes into account at least some of the issues discussed above, as well as possibly other issues.

SUMMARY

In one advantageous embodiment, a method for processing images is provided. A sequence of images is received from a sensor system. A number of objects is present in the sequence of images. Information about the number of objects is identified using the sequence of images and a selection of a level of reduction of data. A set of images from the sequence of images is identified using the selection of the level of reduction of data from different levels of reduction of data. The set of images and the information about the number of objects are represented in data. An amount of the data for the sequence of images is based on the selection of the level of reduction of data.

In another advantageous embodiment, an apparatus comprises an image processing module. The image processing module is configured to receive a sequence of images from a sensor system. A number of objects is present in the sequence of images. The image processing module is configured to identify information about the number of objects using the sequence of images and a selection of a level of reduction of data from different levels of reduction of data. The image processing module is configured to identify a set of images from the sequence of images using the selection of the level of reduction of data. The set of images and the information about the number of objects are represented in data. An amount of the data for the sequence of images is based on the selection of the level of reduction of data.

In yet another advantageous embodiment, an apparatus comprises an information processing module. The information processing module is configured to display information and a set of images on a display on a display device. The information and the set of images are represented in data received from a sensor platform. The sensor platform processes a sequence of images using a selection of a level of reduction of data to identify the information about a number of objects present in the sequence images and the set of images. An amount of the data received from the sensor platform is based on the selection of the level of reduction of data.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood with reference to the following detailed description of an advantageous embodiment of the present disclosure when read in conjunction with the accompanying drawings, wherein:

FIG. 17 is an illustration of a data processing system in accordance with an advantageous embodiment.

DETAILED DESCRIPTION

Figure 1:
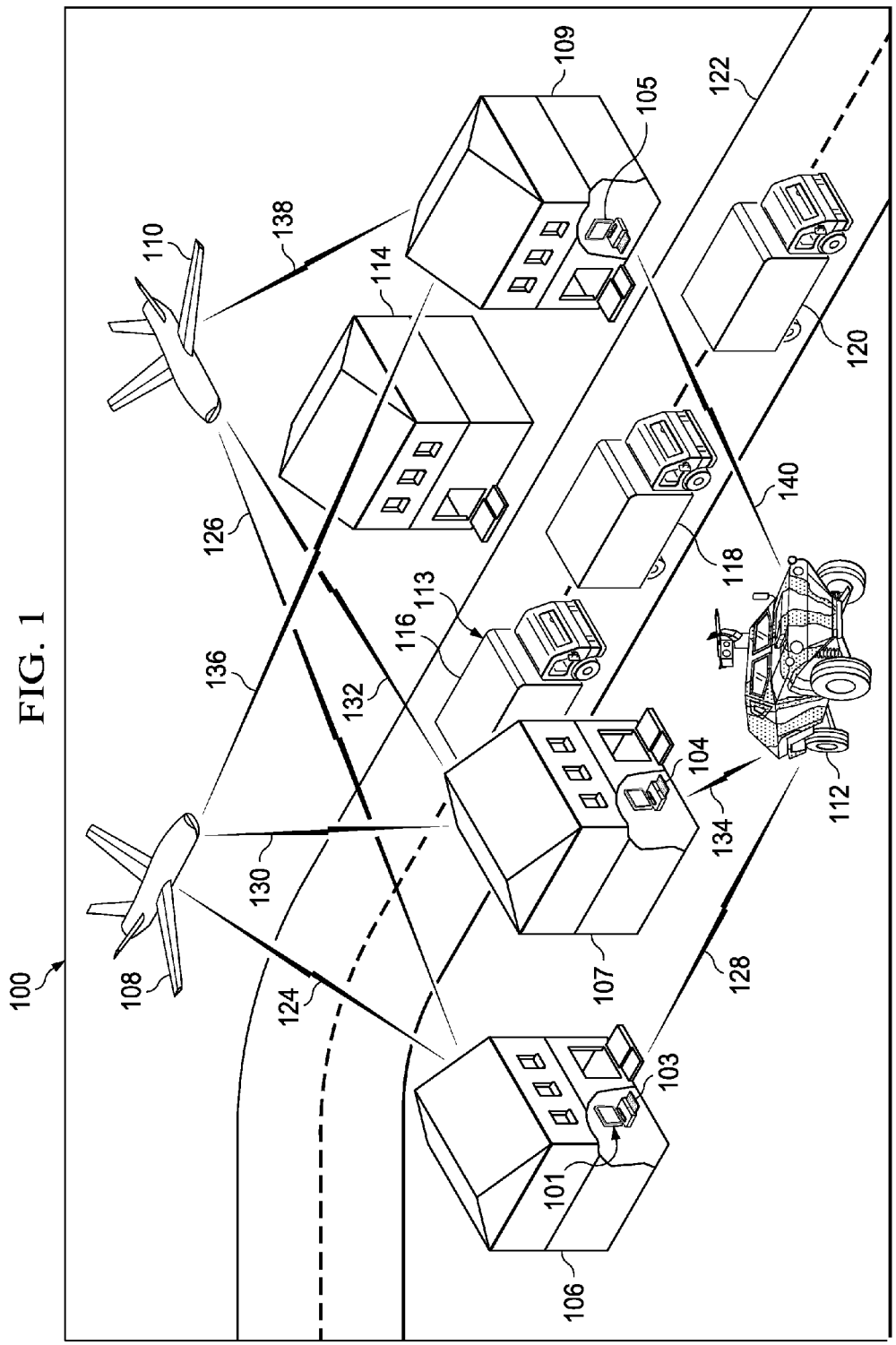
FIG. 1 is an illustration of a video processing environment in accordance with an advantageous embodiment.

The different advantageous embodiments recognize and take into account a number of different considerations. As used herein, a "number", when used with reference to items, means "one or more items." For example, a number of different considerations is one or more different considerations.

The different advantageous embodiments recognize and take into account that when the bandwidth for wireless communications links for a control station is limited, the control station may be unable to receive as much data as desired. For example, the different advantageous embodiments recognize and take into account that the control station may not be able to receive data from as many sensor platforms as desired. The data may represent information. As used herein, information includes messages, commands, program code, images, audio, voice, files, and/or other suitable types of information.

The different advantageous embodiments also recognize and take into account that in some cases, the amount of information represented in the data that the control station receives from a sensor platform may vary. For example, less information may be sent based on the types of objects detected by sensors on a sensor platform. If a sensor platform detects three vehicles in an image that are not vehicles of interest, the amount of information needed may be less than if one of the vehicles is identified as a vehicle of interest.

The different advantageous embodiments recognize and take into account that it would be advantageous to manage bandwidth and the amount of data transmitted over a wireless communications link. The different advantageous embodiments recognize and take into account that one manner in which data representing images sent over a wireless communications link may be reduced is to compress the images. Image compression may be performed using various known techniques. However, with currently-available techniques, the compression of images may not reduce the bandwidth needed for sending the data representing the images over the wireless communications link as much as desired.

The different advantageous embodiments recognize and take into account that in many cases, the actual images may be less important or less useful than information that may be identified using the images. For example, images of a vehicle moving along a road may be less important or useful than information about the speed at which the vehicle is traveling along the road. In this manner, the content of the images or information about objects in the video data may be more relevant.

The different advantageous embodiments recognize and take into account that by transmitting data representing information identified using the images instead of all of the images generated, the data rate required for transmitting the data over a wireless communications link may be reduced to a desired data rate.

Thus, the different advantageous embodiments provide a method and apparatus for processing images. In one advantageous embodiment, a sequence of images is received from a sensor system. A number of objects is present in the sequence of images. Information about the number of objects is identified using the sequence of images and a selection of a level of reduction of data. A set of images from the sequence of images is identified using the selection of the level of reduction of data. The set of images and the information about the number of objects are represented in data. An amount of the data for the sequence of images is based on the selection of the level of reduction of data.

With reference now to FIG. 1, an illustration of a video processing environment is depicted in accordance with an advantageous embodiment. In these illustrative examples, video processing environment 100 comprises processing system 101. Processing system 101 may be implemented using hardware, software, or a combination of the two.

In this illustrative example, processing system 101 may be implemented using a computer system comprising a number of computers. In particular, processing system 101 is implemented using computers 103, 104, and 105 located at ground stations 106, 107, and 109, respectively, in this depicted example. Of course, in other illustrative examples, processing system 101 may include some other number of computers located at various ground stations and/or other suitable locations.

As illustrated, video processing environment 100 also includes sensor platforms 108, 110, and 112. In this illustrative example, sensor platforms 108 and 110 take the form of unmanned aerial vehicles, while sensor platform 112 takes the form of an unmanned ground vehicle.

In these illustrative examples, sensor platforms 108, 110, and 112 generate images of a scene in video processing environment 100. The scene may include some or all of video processing environment 100. For example, the scene may be an area in video processing environment 100. Objects 113 are present in the scene in video processing environment 100. In this illustrative example, objects 113 include building 114, vehicles 116, 118, and 120, and/or road 122.

Sensor platforms 108, 110, and 112 identify information about one or more of objects 113 using the images generated by these sensor platforms. This information may include, for example, without limitation, information about one or more of objects 113, the scene in which one or more of objects 113 are present, relationships between objects 113, movement of one or more of objects 113 in the scene, events that occur in the scene involving one or more of objects 113, and/or other suitable types of information.

Each of sensor platforms 108, 110, and 112 is configured to represent the information identified about the objects and a set of the images generated by the sensor platform in data. As used herein, a "set", when used with reference to items, means zero or more items. When the set of items is zero items, the set is referred to as an empty set or null set. For example, a set of the images generated by sensor platform 108 may be zero images, one image, 10 images, 50 images, or some other number of images.

Each of sensor platforms 108, 110, and 112 sends the data to ground stations 106, 107, and 109. The sensor platforms may send this data to the ground stations while the images are being generated by the sensor platforms. The use of "data" in these illustrative examples refers to the symbols used to represent the information and the set of images. In particular, in these illustrative examples, data comprises the binary digits, which are also referred to as bits, used to represent the information and the set of images.

Sensor platforms 108, 110, and 112 may send data to ground station 106 using wireless communications links 124, 126, and 128, respectively. Further, sensor platforms 108, 110, and 112 may send data to ground station 107 using wireless communications links 130, 132, and 134, respectively. Sensor platforms 108, 110, and 112 may send data to ground station 109 using wireless communications links 136, 138, and 140, respectively.

Sending and receiving data over wireless communications links 124, 126, 128, 130, 132, 134, 136, 138, and 140 may require an overall amount of bandwidth for these wireless communications links. The bandwidth for a wireless communications link is a measure of how much data can be carried in the wireless communications link over a given unit of time. In these illustrative examples, the bandwidth is the maximum amount of data in bits per second (bits/s) that can be transmitted over the wireless communications link.

Reducing the bandwidth required for sending data over one or more of wireless communications links 124, 126, 128, 130, 132, 134, 136, 138, and 140 may be desirable. For example, the overall bandwidth needed for sending the data generated by sensor platforms 108, 110, and 112 to ground station 106 may be reduced. This reduction may increase the bandwidth available for receiving data from other sources at ground station 106. For example, additional sensor platforms may be able to send data to ground station 106 using the extra available bandwidth, if needed.

The overall amount of bandwidth needed for sending data generated by sensor platforms 108, 110, and 112 over wireless communications links 124, 126, 128, 130, 132, 134, 136, 138, and 140 may be controlled by controlling the data rate for sending the data over each of these wireless communications links. The data rate for sending data over a wireless communications link is the number of bits that are sent over the wireless communications link per second.

In these illustrative examples, the sensor platforms may change the data rates for their corresponding wireless communications links independently of each other. For example, the data rates for sending data generated by sensor platform 108 over wireless communication link 124 may be the same as or different from the data rates for sending data generated by sensor platform 110 over wireless communications link 126.

The illustration of video processing environment 100 in FIG. 1 is not meant to imply physical or architectural limitations to the manner in which the different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, other types of sensor platforms may be present in video processing environment 100. Any type of platform having a sensor system configured to generate images may be a sensor platform in video processing environment 100.

For example, a sensor platform may be selected from one of, for example, without limitation, a mobile platform, a stationary platform, a land-based structure, an aquatic-based structure, a space-based structure, an aircraft, an unmanned aerial vehicle, an unmanned ground vehicle, a surface ship, a tank, a personnel carrier, a train, a spacecraft, a space station, a satellite, a submarine, an automobile, a bridge, a tree, a building, or some other suitable type of platform. Further, the sensor system may comprise, for example, without limitation, a camera, a video camera, an infrared camera, and/or some other suitable type of sensor system that generates video data.

Further, in other illustrative examples, the sensor platforms within video processing environment 100 may send data to other platforms in addition to or in place of ground stations 106, 107, and 109. For example, these other platforms may include at least one of an aircraft, a land vehicle, a water vehicle, a space vehicle, a control station, a ground station, a tank, a truck, a tower, a building, or some other suitable type of platform.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Figure 2:
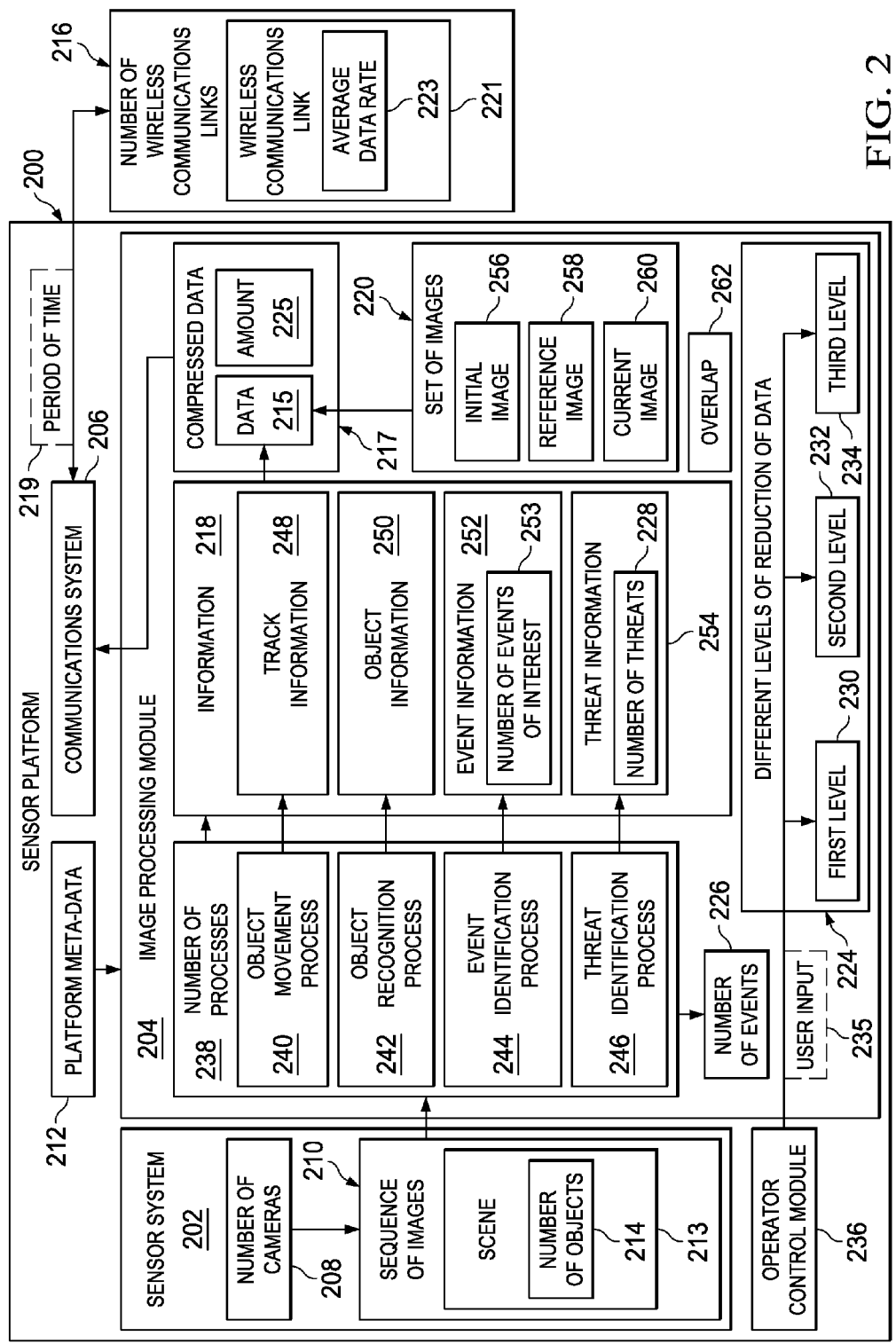
FIG. 2 is an illustration of a block diagram of a sensor platform in accordance with an advantageous embodiment.

With reference now to FIG. 2, an illustration of a block diagram of a sensor platform is depicted in accordance with an advantageous embodiment. In this illustrative example, sensor platform 200 is an example of one implementation for one or more of sensor platforms 108, 110, and/or 112 in FIG. 1.

As depicted, sensor platform 200 comprises sensor system 202, image processing module 204, and communications system 206. Sensor system 202 includes number of cameras 208 in these depicted examples. Number of cameras 208 may include any number of electro-optical cameras, infrared cameras, and/or other suitable type of cameras. Sensor system 202 may also include other types of sensors. For example, sensor system 202 may include a radar system, a light detection and ranging (LIDAR) system, and/or other suitable types of sensors.

In these illustrative examples, each of number of cameras 208 in sensor system 202 may generate sequence of images 210. Sequence of images 210 may be referred to as a video data stream or video data. Sequence of images 210 comprises images that are generated in an order with respect to time. For example, an image that is subsequent to a current image in sequence of images 210 is generated at a later point in time than the current image. In these examples, an image may also be referred to as a frame.

In some illustrative examples, number of cameras 208 may generate other information in addition to sequence of images 210. As one illustrative example, number of cameras 208 may generate time stamps and/or other suitable information for sequence of images 210. Additionally, in other illustrative examples, sensor platform 200 may be configured to generate platform meta-data 212. Platform meta-data 212 may include information about sensor platform 200, such as, for example, without limitation, location information, a route for sensor platform 200, and/or other suitable types of information.

As depicted, scene 213 is present in sequence of images 210. Scene 213 is the area in an environment for which sequence of images 210 is generated. Number of objects 214 may be present in scene 213 in sequence of images 210. In particular, an object in number of objects 214 may be present or appear in scene 213 in one or more of sequence of images 210.

In these illustrative examples, an object in number of objects 214 is considered an object of interest. An object of interest is an object for which more information is desired. The information desired may be about, for example, movement of the object, actions performed by the object, and/or other desired information. An object in number of objects may be, for example, without limitation, a vehicle, a person, an aircraft, a building, a bridge, a manufacturing facility, a land formation, a series of pipelines, a group of structures, and/or some other suitable type of object. Further, number of objects 214 may include one type of object or different types of objects.

Image processing module 204 is configured to receive and process sequence of images 210 for each of number of cameras 208. Image processing module 204 may be implemented using hardware, software, or a combination of hardware and software. For example, image processing module 204 may be implemented in a computer system. This computer system may comprise a number of computers. If more than one computer is present in the number of computers, the computers may be in communication with each other.

In these illustrative examples, image processing module 204 identifies information 218 about number of objects 214 and identifies set of images 220 using sequence of images 210. In some cases, image processing module 204 may also use platform meta-data 212 to identify information 218 about number of objects 214.

Image processing module 204 is configured to represent information 218 and set of images 220 identified using sequence of images 210 in data 215 for sequence of images 210. In particular, image processing module 204 generates data 215 comprising bits that represent information 218 and set of images 220.

Sensor platform 200 is configured to send data 215 to a number of platforms, such as, for example, one or more of ground stations 106, 107, and 109 in FIG. 1. In particular, image processing module 204 sends data 215 to communications system 206. Communications system 206, in turn, sends data 215 to the number of platforms using number of wireless communications links 216.

In these illustrative examples, data 215 is generated and sent over number of wireless communications links 216, while images in sequence of images 210 are generated and processed to identify information 218 and set of images 220. Data 215 for sequence of images 210 represents all of information 218 and set of images 220 identified using all of sequence of images 210 generated by sensor system 202 for a scene.

In these illustrative examples, data 215 sent to the number of platforms over number of wireless communications links 216 may be in a compressed form. For example, image processing module 204 may use currently-available data compression techniques and/or image compression techniques to compress data 215 representing information 218 and set of images 220 to form compressed data 217. Compressed data 217 comprises fewer bits than data 215.

Wireless communications link 221 is an example of one of number of wireless communications links 216. Sensor platform 200 uses wireless communications link 221 to send compressed data 217 to a particular platform. Period of time 219 is the time needed for sending all of compressed data 217 for all of sequence of images 210 to the platform over wireless communications link 221.

In these depicted examples, average data rate 223 is an average of the data rate used in sending all of compressed data 217 over wireless communications link 221 over period of time 219. Average data rate 223 may be reduced by reducing amount 225 of compressed data 217 for sequence of images 210. This reduction also may reduce the bandwidth required for sending compressed data 217 over wireless communications link 221.

The level of reduction in amount 225 of compressed data 217 is based on a selection of one of different levels of reduction of data 224. For example, the type and/or amount of information identified as information 218 and/or the number of images from sequence of images 210 identified as set of images 220 is determined by the level of reduction of data selected from different levels of reduction of data 224.

For example, depending on the level of reduction of data selected from different levels of reduction of data 224, information 218 may include information about number of objects 214 in sequence of images 210, number of events 226 identified using sequence of images 210, number of threats 228 predicted using sequence of images 210, and/or other types of features in sequence of images 210.

An event in number of events 226 may be identified as a change in the scene in sequence of images 210 and/or a change in a relationship between two or more objects over time in sequence of images 210. In one illustrative example, the event in number of events 226 may be identified from two or more images in sequence of images 210. For example, the event may be a person entering or leaving a building. As another example, the event may be one vehicle passing another vehicle on a road.

In some illustrative examples, the event may be identified based on a number of other events. For example, the event may be a passenger pick-up. The passenger pick-up is identified when a vehicle moves into a location in front of a building, a person exits the building, the person gets into the vehicle, and the vehicle moves away from the location in front of the building.

In these illustrative examples, a threat in number of threats 228 may be an undesired event that has not yet occurred or some operational goal that has not yet been achieved. The threat may be predicted based on number of events 226 that have been identified.

For example, a sequence of events may be identified in number of events 226 over a period of time. This sequence of events identified may be used to predict a threat in number of threats 228. The threat may be, for example, an explosion, a fire, unauthorized access to private material, and/or some other suitable type of threat. As one illustrative example, unauthorized access to private material may be predicted based on a particular number of unauthorized people entering a building storing the private material.

As depicted, different levels of reduction of data 224 include first level 230, second level 232, and third level 234. In these illustrative examples, first level 230 is a lowest level of reduction for amount 225 of compressed data 217. Second level 232 is higher than first level 230. Third level 234 has a highest level of reduction for amount 225 of compressed data 217 in these depicted examples.

The level of reduction of data selected may be based on, for example, user input 235 received through operator control module 236 in sensor platform 200. For example, an operator may enter user input 235 that is received through operator control module 236. User input 235 may be a selection of one of first level 230, second level 232, or third level 234. In other illustrative examples, the level of reduction of data selected may be based on input received through communications system 206 from a platform, such as a ground station.

Number of processes 238 running in image processing module 204 identifies information 218 and set of images 220 based on the selection of one of different levels of reduction of data 224. Number of processes 238 may take the form of hardware and/or software in these illustrative examples.

As depicted, number of processes 238 may include object movement process 240, object recognition process 242, event identification process 244, and threat identification process 246. In these illustrative examples, a process in number of processes 238 may use information identified by other processes in number of processes 238 to identify information 218. For example, object movement process 240 may identify information about number of objects 214 that are moving in sequence of images 210 that may be used by object recognition process 242.

Further, event identification process 244 may use information identified by object movement process 240 and object recognition process 242 to identify information about number of events 226. Of course, in other illustrative examples, event identification process 244 may only use information identified by object recognition process 242. Additionally, threat identification process 246 may use information identified by event identification process 244, object movement process 240, and/or object recognition process 242 to identify number of threats 228.

In this manner, a process in number of processes 238 may be implemented using less software and/or hardware, because that process is able to use the results from one or more other processes. In other illustrative examples, the different processes in number of processes 238 may work independently of each other to identify information 218 and set of images 220.

In these illustrative examples, object movement process 240 identifies track information 248 using sequence of images 210. Track information 248 describes movement of number of objects 214. In particular, track information 248 describes movement of any objects that are moving in number of objects 214. For example, track information 248 for an object in number of objects 214 may include at least one of a previous location, a current location, a direction of travel, a speed, a size of the object, a color of the object, and/or other suitable information describing the movement of the object.

Object recognition process 242 identifies object information 250 using at least one of track information 248 and sequence of images 210. Object information 250 describes number of objects 214. Object information 250 describes objects in number of objects 214 that are moving and/or stationary. Object information 250 may include, for example, without limitation, an identification of the object, a type of object, a color of the object, dimensions for the object, a shape of the object, and/or other suitable information describing the object.

Further, event identification process 244 identifies event information 252 using at least one of track information 248, object information 250, and sequence of images 210. Event information 252 describes number of events of interest 253 in number of events 226. Event information 252 may include, for example, without limitation, an identification of an event of interest, a list of objects in number of objects 214 involved in the event of interest, a location of the event of interest, a start time for the event of interest, a duration of the event of interest, information about events that lead up to the event of interest, and/or other suitable information about the event of interest.

In these illustrative examples, number of events of interest 253 may include any event in number of events 226 for which additional information is desired. In one illustrative example, an event of interest in number of events of interest 253 may be identified based on, for example, an identification of events in number of events 226 that lead up to the event of interest, form the event of interest, and/or trigger the event of interest.

Additionally, in these depicted examples, threat identification process 246 identifies threat information 254 for number of threats 228 predicted based on number of events 226. Threat information 254 may be identified using at least one of track information 248, object information 250, event information 252, and sequence of images 210.

Threat information 254 may include, for example, without limitation, at least one of an identification of a threat in number of threats 228, a list of events in number of events 226 that contribute to the prediction of the threat, any event information 252 identified for the events contributing to the prediction of the threat, a list of objects in number of objects 214 involved in the threat, and/or other suitable information.

In these illustrative examples, when first level 230 is selected from different levels of reduction of data 224, information 218 represented in compressed data 217 comprises track information 248. Further, set of images 220 for first level 230 comprises one or more images. With first level 230, set of images 220 may always include initial image 256. Initial image 256 is a first image in sequence of images 210.

At the beginning of processing of sequence of images 210, initial image 256 functions as reference image 258. Current image 260 may be an image that is subsequent to reference image 258 in sequence of images 210. During processing, current image 260 is compared to reference image 258. Current image 260 is added to set of images 220 when overlap 262 between scene 213 in current image 260 and scene 213 in reference image 258 is less than some selected threshold.

In these illustrative examples, scene 213 in current image 260 and scene 213 in reference image 258 are offset. Overlap 262 is measured by aligning current image 260 and reference image 258 such that scene 213 in both images substantially match. In other words, current image 260 and reference image 258 are aligned such that features in scene 213 in these two images substantially match.

For example, not all of scene 213 in reference image 258 may be present in current image 260, and not all of scene 213 in current image 260 may be present in reference image 258 when scene 213 in these two images are offset. Overlap 262 is the portion of current image 260 and reference image 258 for which scene 213 is substantially the same when current image 260 and reference image 258 are aligned.

When current image 260 is added to set of images 220 based on overlap 262 being less than some selected threshold, current image 260 becomes reference image 258. Further, when overlap 262 between scene 213 in current image 260 and scene 213 in reference image 258 is not less than the selected threshold, a next image in sequence of images 210 after current image 260 becomes the new current image for comparison with reference image 258.

In these illustrative examples, when second level 232 is selected from different levels of reduction of data 224, information 218 represented in compressed data 217 comprises object information 250. In some illustrative examples, track information 248 may also be included for second level 232.

Further, with second level 232, set of images 220 represented in compressed data 217 may be a null set. Object information 250 and any track information 248 represented in compressed data 217 when second level 232 is selected may be a lesser amount 225 of compressed data 217 as compared to track information 248 and set of images 220 represented in compressed data 217 when first level 230 is selected.

In this manner, average data rate 223 for sending compressed data 217 is reduced when second level 232 is selected, as compared to when first level 230 is selected. Of course, in some illustrative examples, set of images 220 may include one or more images from sequence of images 210 for second level 232 in different levels of reduction of data 224.

In these illustrative examples, when third level 234 is selected from different levels of reduction of data 224, information 218 represented in compressed data 217 comprises event information 252 and any threat information 254 that has been identified. In some illustrative examples, with a selection of third level 234, track information 248 and/or object information 250 for any objects involved in number of events of interest 253 described in event information 252 and/or number of threats 228 described in threat information 254 may also be included in information 218.

Additionally, with the selection of third level 234, set of images 220 represented in compressed data 217 may be a null set. However, in other illustrative examples, set of images 220 may include one or more images corresponding to number of events of interest 253 described in event information 252 and/or number of threats 228 described in threat information 254. For example, set of images 220 may include an image generated at the start time for an event of interest, an image generated at the end time for an event of interest, an image in which objects involved in a threat are present in scene 213, and/or other suitable types of images from sequence of images 210.

Number of events of interest 253 may not be identified and/or number of threats 228 may not be predicted using sequence of images 210 as often as number of objects 214 may be identified in the different images in sequence of images 210. As a result, event information 252 and any threat information 254 may be represented in a lesser amount 225 of compressed data 217 for a selection of third level 234 as compared to amount 225 of compressed data 217 generated for a selection of first level 230 or second level 232 from different levels of reduction of data 224.

Additionally, in some illustrative examples, no level may be selected from different levels of reduction of data 224. For example, user input 235 may indicate that a level is not to be selected from different levels of reduction of data 224. When a level of reduction of data is not selected, image processing module 204 does not identify information 218 or set of images 220.

Instead, image processing module 204 sends sequence of images 210 over wireless communications link 221 using other methods for representing images in compressed data 217. These methods do not include sending information about number of objects 214, number of events 226, and/or number of threats 228. Further, these methods do not reduce the number of images in sequence of images 210 that are sent. Still further, amount 225 of compressed data 217 generated using these methods is greater as compared to amount 225 of compressed data 217 generated when one of different levels of reduction of data 224 is selected.

As one illustrative example, currently-available image compression techniques may be used to represent sequence of images 210 in compressed data 217 when a level of reduction of data is not selected. These compression techniques may include, for example, compression methods, such as MPEG-2, MPEG-4, E.264, and Advanced Video Coding, as well as standard protocols, such as JPEG, JPEG-2000, motion compensated JPEG-2000, and/or other currently-available compression techniques.

In these illustrative examples, a selection of a level of reduction of data from different levels of reduction of data 224 may be changed during operation of sensor platform 200. As one illustrative example, the selection of the level of reduction of data may be changed during processing of sequence of images 210 and while compressed data 217 is being sent over wireless communications link 221.

The illustration of sensor platform 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, number of wireless communications links 216 may include wireless communications links in which data is transmitted using at least one of electromagnetic signals, acoustic signals, and/or other suitable types of signals. Further, in some advantageous embodiments, other levels of reduction of data may be present in different levels of reduction of data 224.

For example, additional levels of reduction of data may cause set of images 220 to be formed having different resolutions. In other illustrative examples, compressed data 217 may be generated representing set of images 220 and not information 218. As yet another example, different levels of reduction of data 224 may include a level corresponding to no reduction of data.

In still other illustrative examples, number of processes 238 may include processes other than the processes described above. For example, additional processes may be present for generating information 218 about number of objects 214, number of events 226, and/or number of threats 228.

Figure 3:
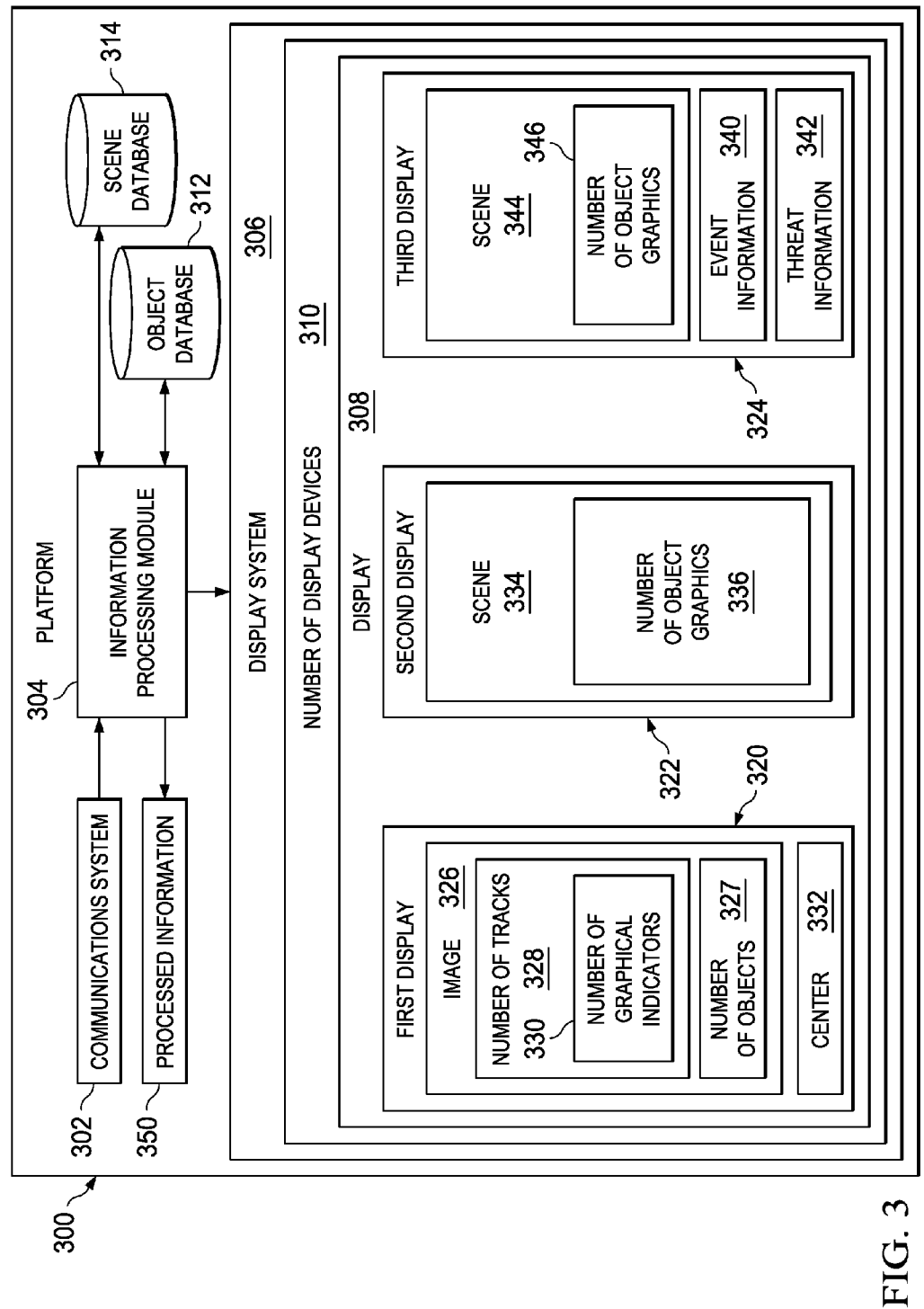
FIG. 3 is an illustration of a platform with a processing system in accordance with an advantageous embodiment.

With reference now to FIG. 3, an illustration of a platform with a processing system is depicted in accordance with an advantageous embodiment. In this depicted example, platform 300 is an example of one manner in which one or more of ground stations 106, 107, and 109 in FIG. 1 may be implemented.

Platform 300 is configured to receive and process compressed data 217 sent from sensor platform 200 in FIG. 2. As depicted, platform 300 has communications system 302, information processing module 304, and display system 306.

Communications system 302 is configured to receive, for example, compressed data 217 sent from sensor platform 200 in FIG. 2. Communications system 302 sends compressed data 217 to information processing module 304 for processing.

Information processing module 304 is implemented using hardware and/or software. For example, information processing module 304 may be implemented in a computer system comprising a number of computers, such as one of computer systems 103, 104, and 105 in FIG. 1.

In these illustrative examples, information processing module 304 decompresses compressed data 217 to identify data 215 from FIG. 2. This decompression may be performed using currently-available data decompression techniques. Further, information processing module 304 uses data 215 to identify information 218 and set of images 220 from FIG. 2.

Information processing module 304 uses information 218 and/or set of images 224 to generate display 308. As depicted, display 308 may be displayed on display system 306. Display system 306 is hardware and comprises number of display devices 310. A display device in number of display devices 310 may be selected from one of a liquid crystal display (LCD) device, a plasma display device, a cathode ray tube (CRT) device, an organic liquid emitting diode display, a holographic display device, a light emitting diode display, and/or other suitable types of display devices.

Information processing module 304 may use other information in addition to information 218 and set of images 220 to generate display 308. For example, information processing module 304 may use at least one of object database 312, scene database 314, and/or other collections of information to generate display 308.

As one illustrative example, a visual representation of an object described in information 218 may be obtained from object database 312 when set of images 220 in FIG. 2 is a null set. This visual representation may be, for example, a picture of a same type of object.

In another illustrative example, information processing module 304 may use object database 312 to obtain a graphic or graphical indicator for the object. Object database 312 may include graphical indicators that may be used to represent various objects. These graphical indicators may include, for example, icons, images, lines, text, labels, and/or other suitable types of graphical indicators.

In some illustrative examples, information processing module 304 may use scene database 314 to obtain maps, satellite images, and/or other suitable representations of scene 213 in FIG. 2 for use in display 308 based on information 218. Scene database 314 may be used when set of images 220 is a null set.

As depicted, display 308 may take the form of first display 320, second display 322, third display 324, or some other suitable type of display. First display 320 is generated when compressed data 217 received at platform 300 has been generated for a selection of first level 230 from different levels of reduction of data 224 in FIG. 2.

As depicted, first display 320 includes image 326 and number of tracks 328 on image 326. Number of tracks 328 may be for number of objects 327 in image 326. Image 326 is an image received in set of images 220. Each track in number of tracks 328 is generated using track information 248 in information 218. A track may identify the position of an object and/or a direction of movement for the object in image 326.

In these depicted examples, number of tracks 328 takes the form of number of graphical indicators 330. In some illustrative examples, number of graphical indicators 330 may provide information about number of objects 327. For example, a graphical indicator in number of graphical indicators 330 for an object in number of objects 327 may have a size on first display 320 that indicates a size of the object. Further, the graphical indicator may have a color that indicates a particular type of object. Of course, in other illustrative examples, number of graphical indicators 330 may provide other suitable information about number of objects 327. Number of graphical indicators 330 for number of objects 327 may be obtained from object database 312 in these examples.

Additionally, image 326 may be moved relative to first display 320 such that center 332 of first display 320 is the center point of a viewpoint of the camera from which image 326 was generated. In these illustrative examples, when set of images 220 includes images in addition to image 326, these additional images are displayed in first display 320 as the additional images are received and processed by information processing module 304.

In these depicted examples, second display 322 is generated when compressed data 217 received at platform 300 has been generated for a selection of second level 232 from different levels of reduction of data 224 in FIG. 2. Second display 322 displays scene 334 with number of object graphics 336 displayed on scene 334. With second display 322, no images are displayed. Scene 334 may take the form of, for example, at least one of a map, a satellite image, and/or some other suitable type of presentation for scene 213 in sequence of images 210. For example, scene 334 may be a map generated using scene database 314.

Scene 334 may be selected from scene database 314 based on information 218. For example, information 218 may include information about scene 213 in sequence of images 210 generated by sensor system 202. This information may include geographical coordinates, geographical features, location information, and/or other suitable information about scene 213. Further, this information may be used to search scene database 314 for scene 334 to represent scene 213 in sequence of images 210.

In these illustrative examples, each of number of object graphics 336 in second display 322 is a representation of an object. Number of object graphics 336 may be obtained from object database 312 in these examples. For example, object database 312 may be searched for number of object graphics 336 based on object information 250 in information 218. Number of object graphics 336 may include, for example, images of objects obtained from object database 312, graphical indicators, shapes, symbols, pictures, and/or other representations of objects.

In these illustrative examples, third display 324 is generated when compressed data 217 received at platform 300 has been generated for a selection of third level 234 from different levels of reduction of data 224 in FIG. 2. Third display 324 may include event information 340 and/or threat information 342. Event information 340 includes information about number of events of interest 253 described in event information 252 in information 218. Threat information 342 includes information about number of threats 228 described in threat information 254 in information 218.

In one illustrative example, scene 344 may also be displayed on third display 324. Scene 344 may take various forms, such as, for example, an image included in set of images 220, a satellite image retrieved from scene database 314, and/or some other suitable type of scene.

Additionally, number of object graphics 346 may be displayed on scene 344. Number of object graphics 346 may be obtained from object database 312 in these examples. Number of object graphics 346 may represent a number of objects related to number of events of interest 253 described in event information 252 and/or number of threats 228 described in threat information 254. Additionally, number of object graphics 346 may be moved on scene 344 using track information 248 in information 218.

The illustration of platform 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, information processing module 304 may process compressed data 217 received from sensor platform 200 in FIG. 2 but may not generate display 308. For example, information processing module 304 may process compressed data 217 to form processed information 350. Processed information 350 may be sent to a processing unit configured to make decisions using processed information 350. This processing unit may run or include, for example, an artificial intelligence program, a neural network, an expert system, and/or other suitable types of decision-making processes.

Figure 4:
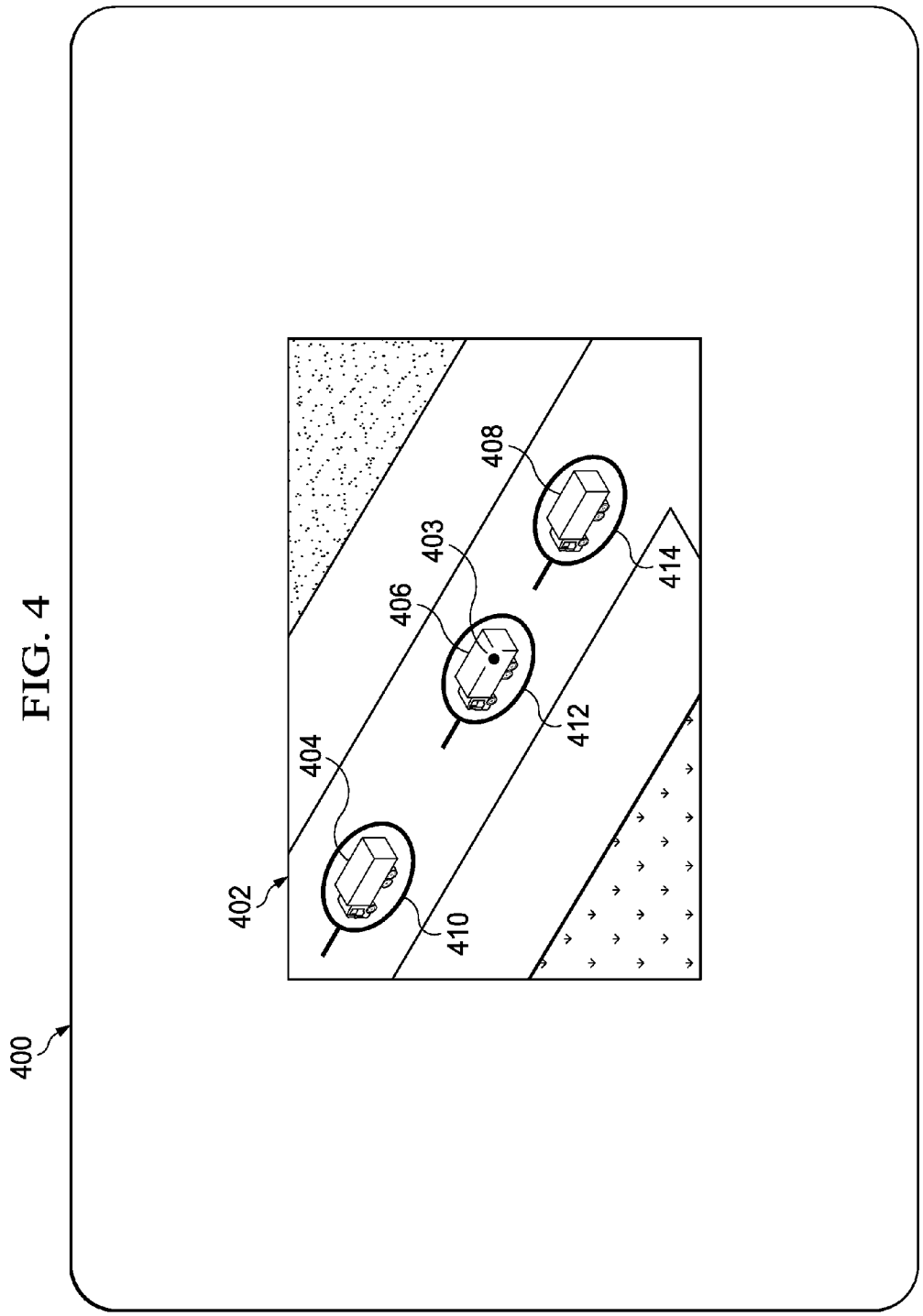
FIG. 4 is an illustration of a display for a first point in time in accordance with an advantageous embodiment.
Figure 5:
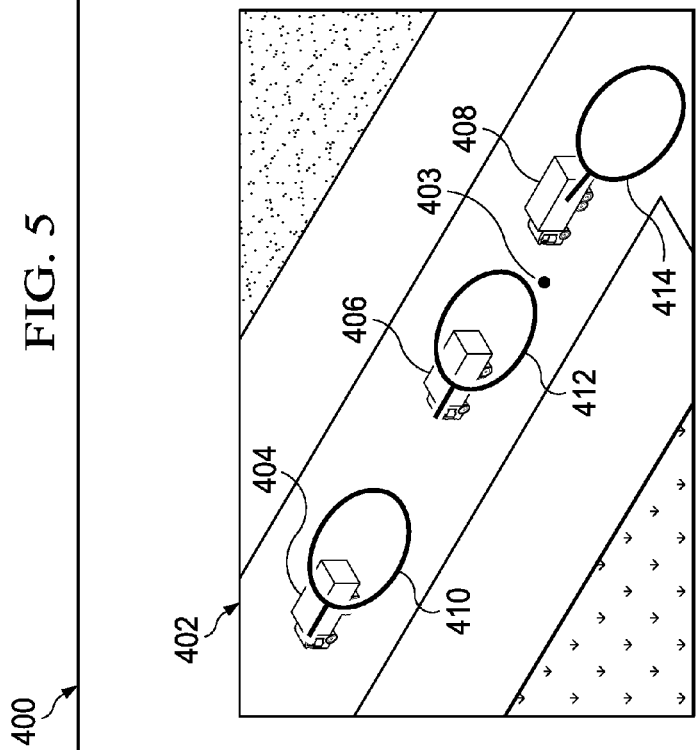
FIG. 5 is an illustration of a display for a second point in time in accordance with an advantageous embodiment.
Figure 6:
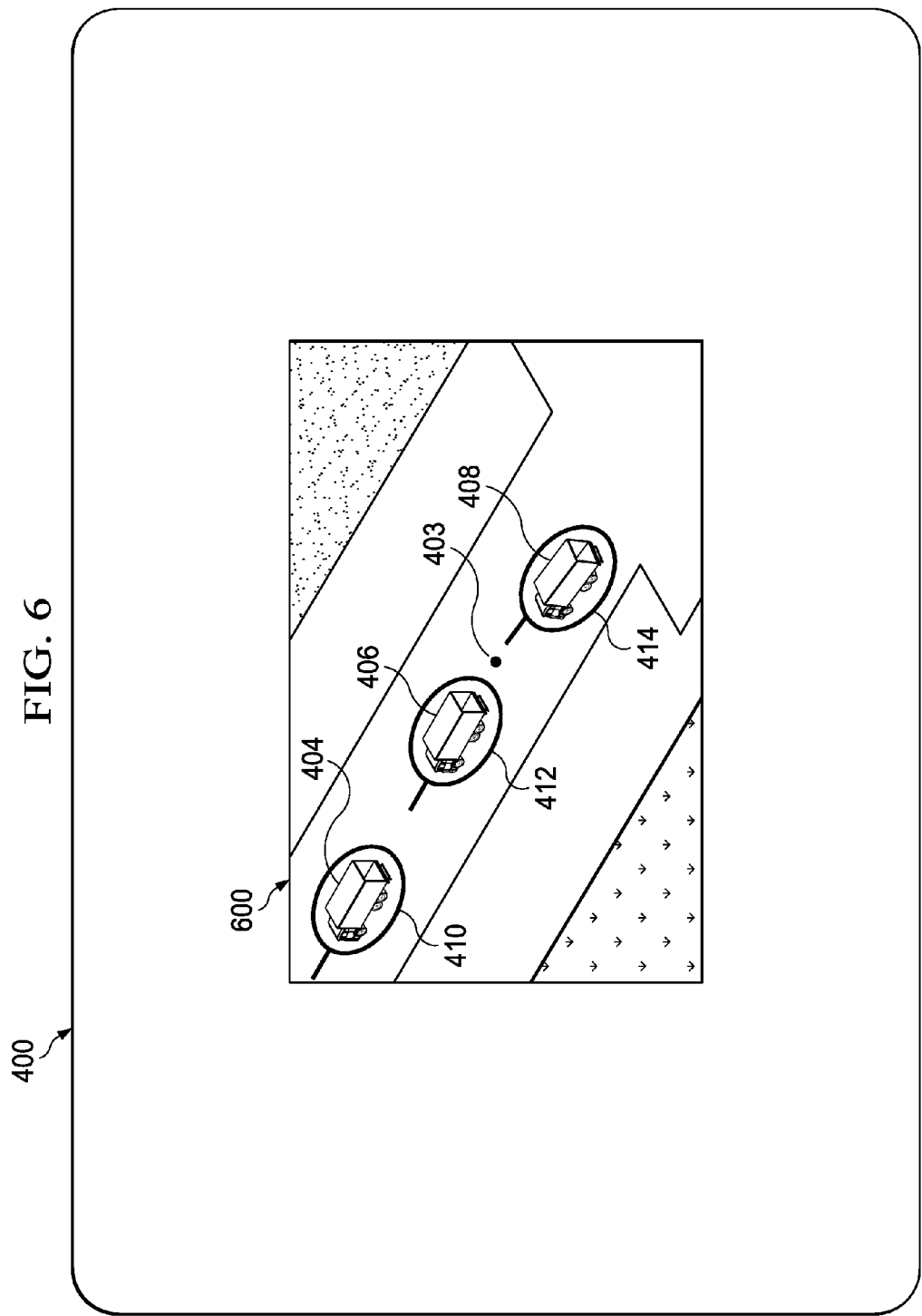
FIG. 6 is an illustration of a display for a third point in time in accordance with an advantageous embodiment.

Turning now to FIGS. 4-6, illustrations of a display at different points in time are depicted in accordance with an advantageous embodiment. Display 400 depicted in FIGS. 4-6 is an example of one implementation for first display 320 displayed on display system 306 in FIG. 3. FIGS. 4-6 are arranged in a sequential order to illustrate display 400 at different points in time.

Turning now to FIG. 4, display 400 is for a first point in time. Display 400 includes image 402. In this illustrative example, image 402 is an image in a sequence of images generated by a camera on an unmanned aerial vehicle during flight. In particular, image 402 is a first image in a set of images received from a sensor platform. This set of images may be, for example, set of images 220 received from sensor platform 200 in FIG. 2.

In this illustrative example, center 403 of display 400 represents a center of the viewpoint of the camera. Further, image 402 is centered on center 403 of display 400. As depicted, vehicles 404, 406, and 408 are present in the scene in image 402 in display 400. Further, graphical indicators 410, 412, and 414 are also present in display 400. Graphical indicators 410, 412, and 414 represent vehicles 404, 406, and 408, respectively.

Graphical indicators 410, 412, and 414 are used to track the movement of vehicles 404, 406, and 408, respectively, in display 400. The position and orientation of the graphical indicators in display 400 represent a position and orientation of the vehicles in the scene with respect to the camera generating the images of the scene.

With reference now to FIG. 5, display 400 is for a second point in time after the first point in time for display 400 in FIG. 4. In this figure, the current positions of graphical indicators 410, 412, and 414 in display 400 at this second point in time indicate current positions of vehicles 404, 406, and 408, respectively. The positions for these graphical indicators, with respect to the positions of the vehicles on display 400, indicate movement of the vehicles. In this manner, these graphical indicators track the movement of the vehicles over time.

At this second point in time, a new image has not been received. As a result, image 402 remains present in display 400. In this illustrative example, the position and orientation of image 402 in display 400 have changed, as compared to the position and orientation of image 402 in display 400 in FIG. 4. In particular, the position and orientation of image 402 in display 400 have been adjusted to take into account changes in the position and orientation of the camera generating the images during flight of the unmanned aerial vehicle.

More specifically, the position and orientation of image 402 are adjusted relative to display 400 such that center 403 of display 400 represents the center of the camera generating the images of the scene at the time corresponding to the second point in time. In particular, image 402 is centered such that center 403 of display 400 represents the center of the camera at the point in time for which the graphical indicators have their current positions.

With reference now to FIG. 6, display 400 is for a third point in time after the first and second points in time for display 400 in FIGS. 4 and 5. In this illustrative example, image 402 from FIGS. 4 and 5 is no longer displayed. At the third point in time, image 600 is received. Image 600 replaces image 402 in display 400. Image 600 is a subsequent image to image 402 from FIG. 4 in the set of images received from the sensor platform.

As depicted, image 600 is positioned relative to display 400 such that center 403 of display 400 represents the center of the camera generating the images of the scene at the point in time corresponding to the graphical indicators for the vehicles. In this illustrative example, the current positions of graphical indicators 410, 412, and 414 in display 400 indicate current positions of vehicles 404, 406, and 408, respectively.

Figure 7:
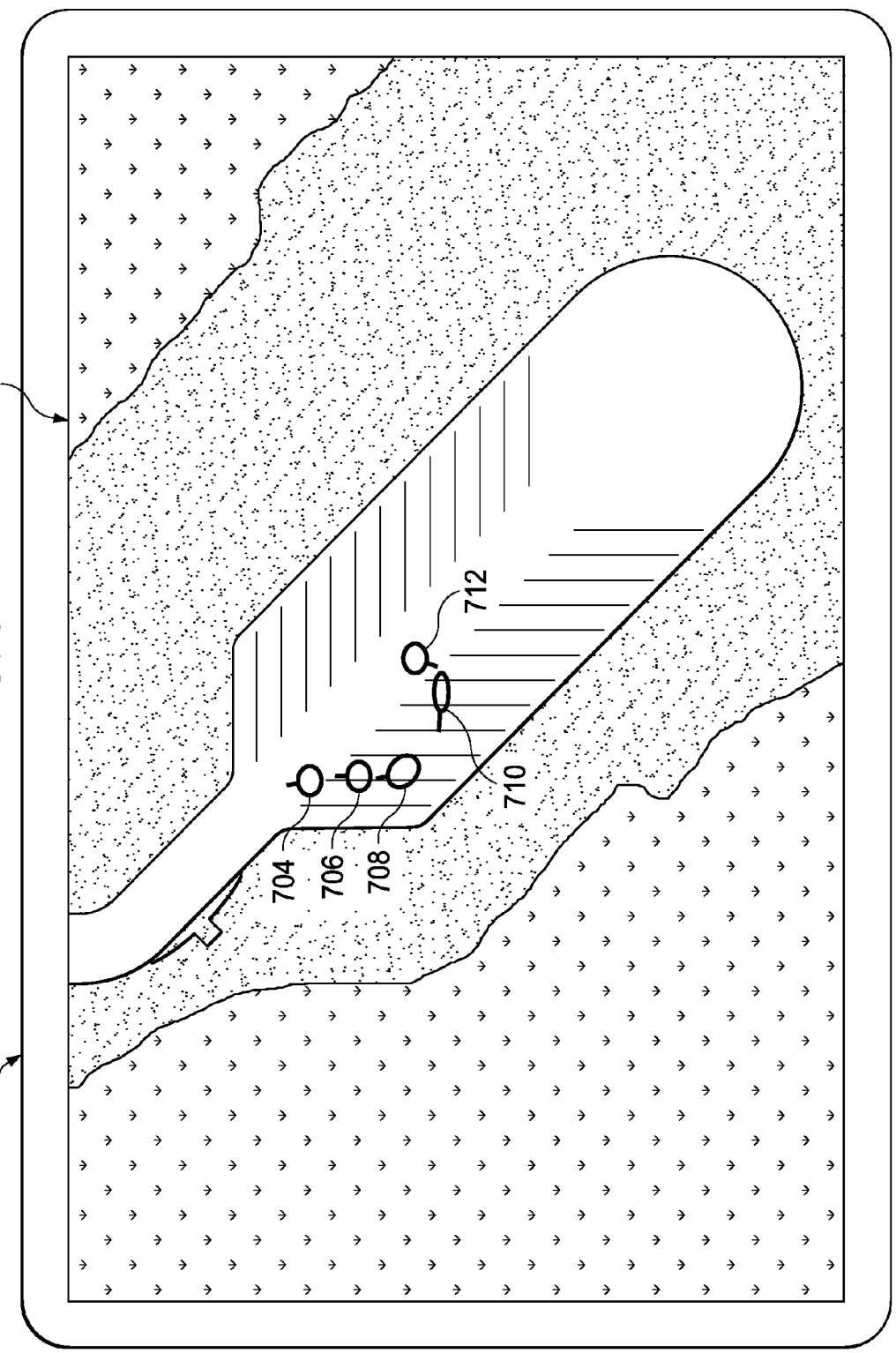
FIG. 7 is an illustration of a display generated using compressed information in accordance with an advantageous embodiment.

With reference now to FIG. 7, an illustration of a display generated using compressed information is depicted in accordance with an advantageous embodiment. In this illustrative example, display 700 is an example of one implementation for second display 322 in FIG. 3.

As depicted, display 700 includes scene 702. Scene 702 is a satellite image of the scene in an image generated by a camera. The satellite image may be obtained from, for example, a scene database, a map database, a satellite imagery database, and/or some other suitable source.

In this illustrative example, graphical indicators 704, 706, 708, 710, and 712 are present in display 700. These graphical indicators represent vehicles. For example, a color, pattern, and/or thickness for these graphical indicators may indicate a type of vehicle.

Figure 8:
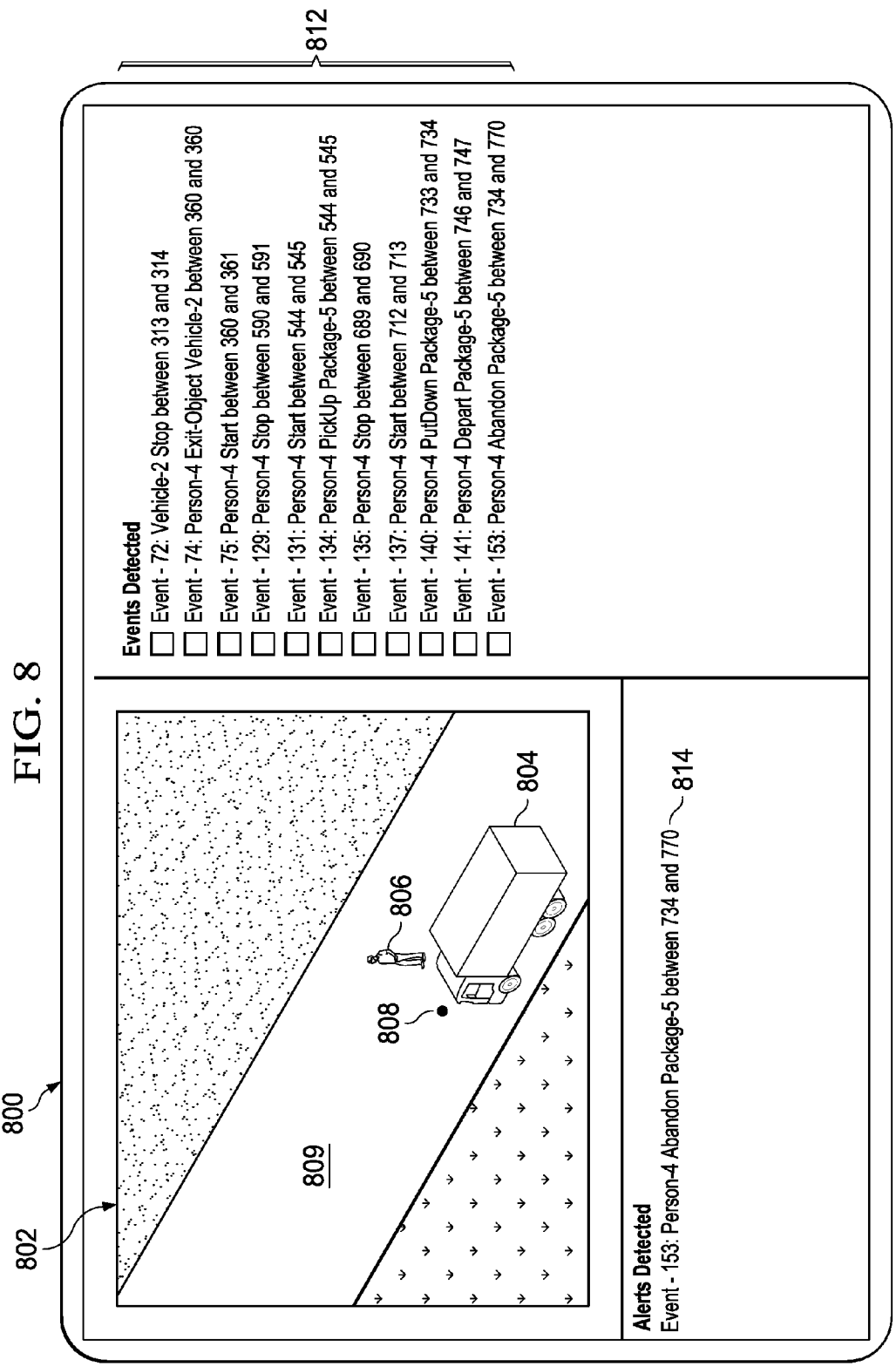
FIG. 8 is an illustration of a display generated using compressed information in accordance with an advantageous embodiment.

With reference now to FIG. 8, an illustration of a display generated using compressed information is depicted in accordance with an advantageous embodiment. In this illustrative example, display 800 is an example of one implementation for third display 324 in FIG. 3.

As depicted, display 800 includes scene 802. Scene 802 is a representation of a scene based on the information received. Vehicle 804, person 806, package 808, and road 809 are presented in scene 802.

Additionally, display 800 includes event information 812. Event information 812 identifies information about a number of events that have occurred in the images generated using the camera.

Further, alert 814 is also displayed in display 800. An operator viewing display 800 may initiate a number of actions based on alert 814. These actions may include alerting the appropriate authorities about an event, sending out a number of notifications, and/or other suitable actions.

Figure 9:
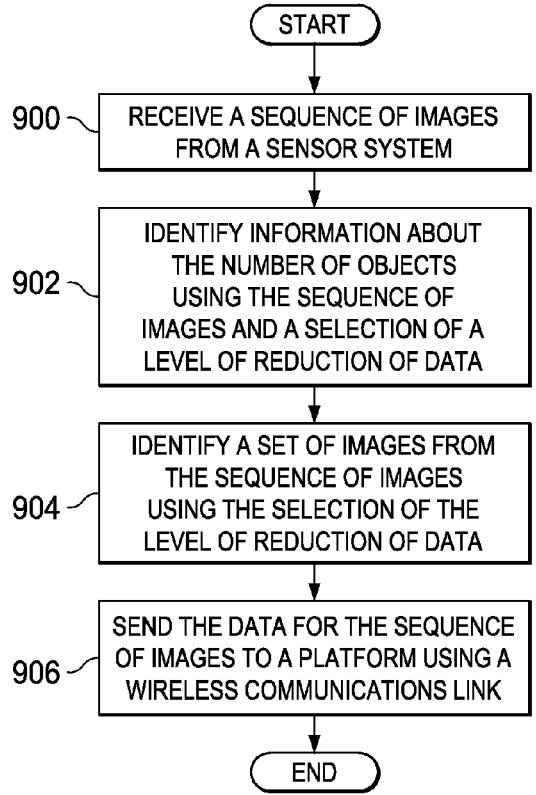
FIG. 9 is an illustration of a flowchart of a process for processing images in accordance with an advantageous embodiment.

With reference now to FIG. 9, an illustration of a flowchart of a process for processing images is depicted in accordance with an advantageous embodiment. The process illustrated in FIG. 9 may be implemented in sensor platform 200 in FIG. 2.

The process begins by receiving a sequence of images from a sensor system (operation 900). A number of objects are present in the sequence of images. The process then identifies information about the number of objects using the sequence of images and a selection of a level of reduction of data (operation 902). The level of reduction of data is selected from different levels of reduction of data.

Thereafter, the process identifies a set of images from the sequence of images using the selection of the level of reduction of data (operation 904). The set of images and the information about the number of objects are represented in data. An amount of the data for the sequence of images is based on the selection of the level of reduction of data. In this illustrative example, the amount of the data generated for the sequence of images is reduced when a higher level of reduction of data is selected, as compared to when a lower level of reduction of data is selected.

The process then sends the data for the sequence of images to a platform using a wireless communications link (operation 906), with the process terminating thereafter. The bandwidth used in the wireless communications link for sending the data representing the information about the number of objects and the set of images is less than the bandwidth needed for sending data representing all images in the sequence of images. Further, an average data rate for sending all the data for the sequence of images is reduced when a higher level of reduction of data is selected as compared to when a lower level of reduction of data is selected.

Figure 10:
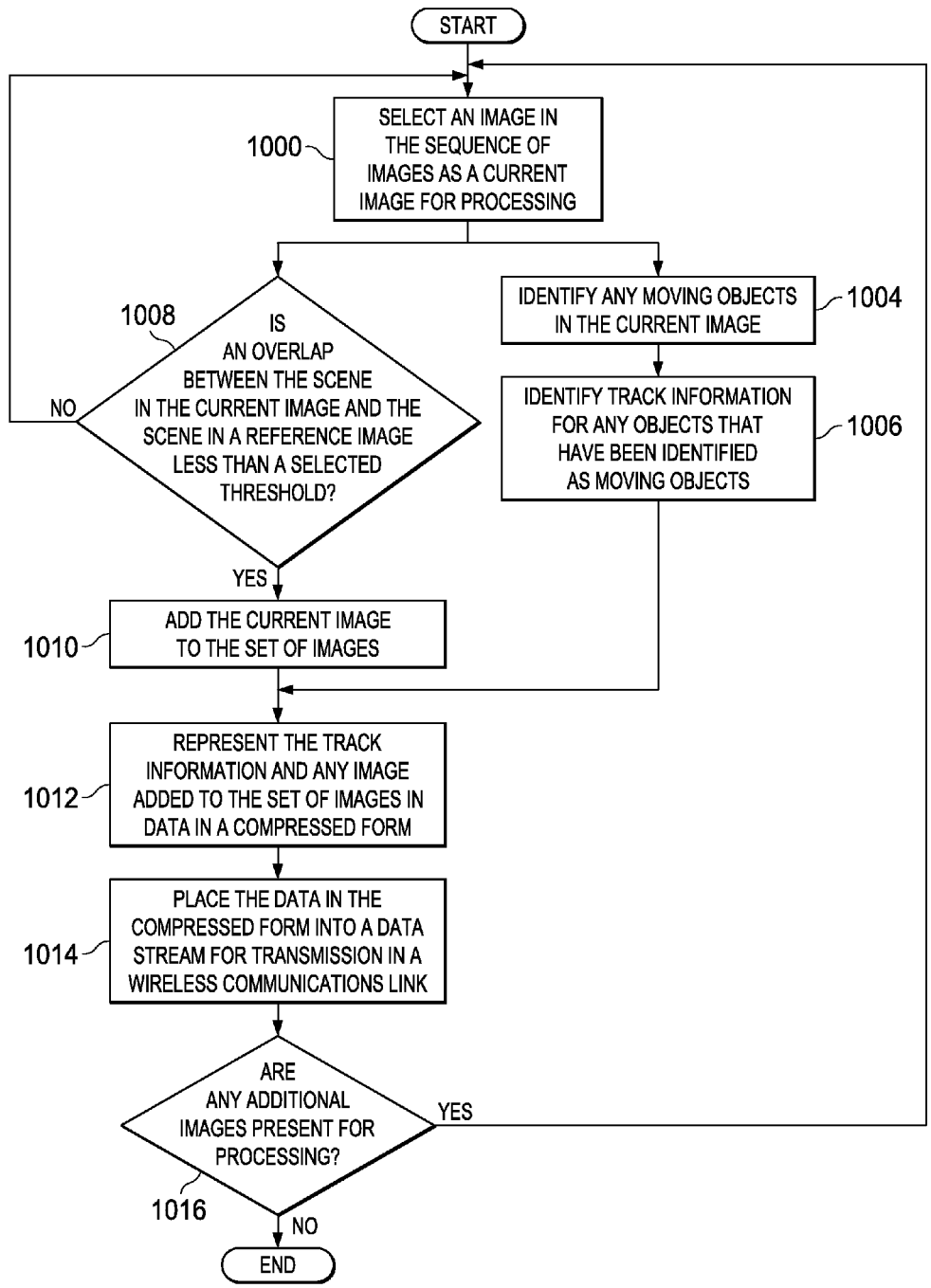
FIG. 10 is an illustration of a flowchart of a process for processing images using a first level reduction of data in accordance with an advantageous embodiment.

With reference now to FIG. 10, an illustration of a flowchart of a process for processing images using a first level of reduction of data is depicted in accordance with an advantageous embodiment. The process illustrated in FIG. 10 may be implemented in image processing module 204 in FIG. 2. In particular, this process describes one manner in which sequence of images 210 in FIG. 2 may be processed using first level 230 from different levels of reduction of data 224 in FIG. 2.

The process begins by selecting an image in the sequence of images as a current image for processing (operation 1000). In operation 1000, the sequence of images is generated by a camera.

The process identifies any moving objects in the current image (operation 1004). A moving object may be an object that has moved to a new position relative to a scene in the current image from a previous position in the scene in the previous image. The previous image is the image in the sequence of images generated just before the current image.

The process identifies track information for any objects that have been identified as moving objects (operation 1006). This track information may include, for example, a current location of the object, a previous location of the object, a direction of travel, an orientation of the object, a velocity, and/or other suitable information.

Further, after operation 1000, the process also determines whether an overlap between the scene in the current image and the scene in a reference image is less than a selected threshold (operation 1008). The reference image may be an initial image in the sequence of images or an image previously added to a set of images.

If the overlap between the scene in the current image and the scene in the reference image is less than the selected threshold, the process adds the current image to the set of images (operation 1010). Otherwise, if the overlap between the scene in the current image and the scene in the reference image is not less than the selected threshold, the process returns to operation 1000 as described above.

In this illustrative example, when the current image is the initial image in the sequence of images, a reference image is not present for comparison with the initial image in operation 1008. As a result, when the current image is the initial image, the initial image is always added to the set of images in operation 1010.

After operation 1006 and after operation 1010, the process represents the track information and any image added to the set of images in data in a compressed form (operation 1012). The data in the compressed form is then placed into a data stream for transmission in a wireless communications link (operation 1014).

The process then determines whether any additional images are present for processing (operation 1016). If additional images are not present, the process terminates. If, however, additional images are present, the process returns to operation 1000 as described above, with the process selecting a next image in the sequence of images as the current image for processing.

With reference again to operation 1012, if the comparison indicates that the difference is not greater than the selected threshold, the process proceeds to operation 1000 as described above.

Figure 11:
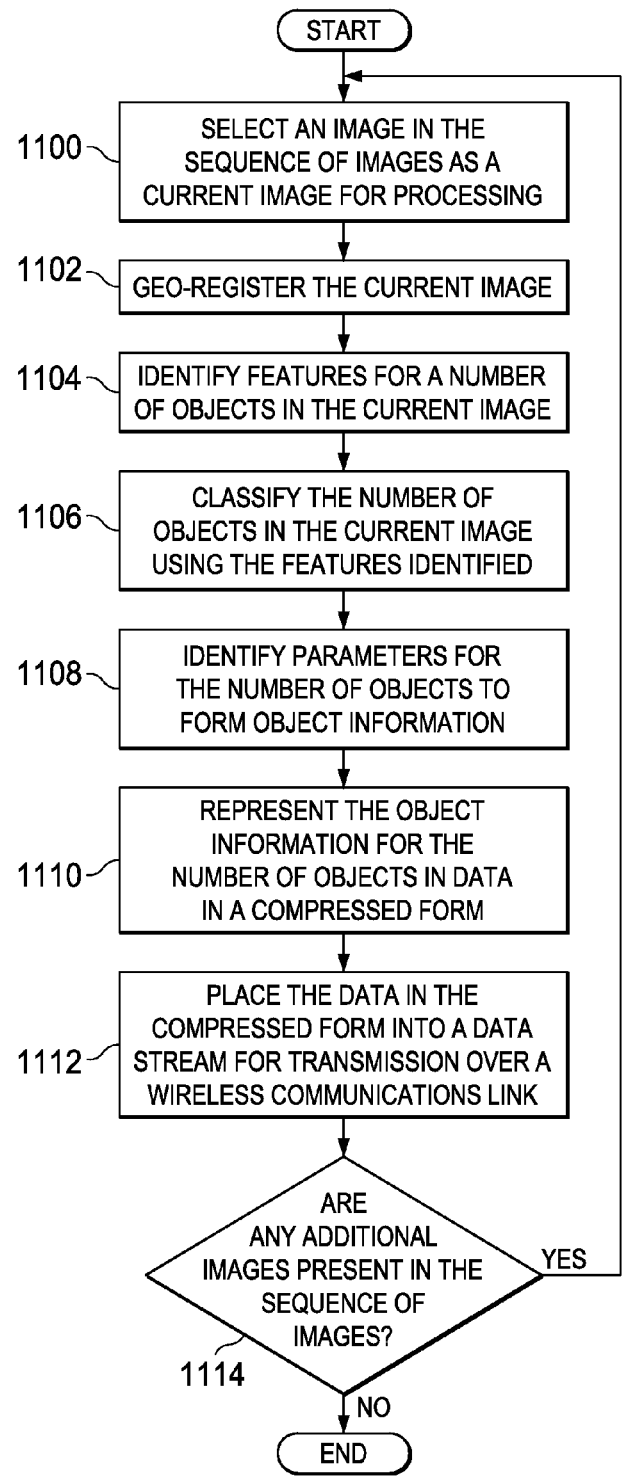
FIG. 11 is an illustration of a flowchart of a process for compressing video information in accordance with an advantageous embodiment.

With reference now to FIG. 11, an illustration of a flowchart of a process for compressing video information is depicted in accordance with an advantageous embodiment. The process illustrated in FIG. 11 may be implemented in image processing module 204 in FIG. 2. In particular, this process describes one manner in which sequence of images 210 in FIG. 2 may be processed using second level 232 from different levels of reduction of data 224 in FIG. 2.

The process begins by selecting an image in the sequence of images as a current image for processing (operation 1100). The process then geo-registers the current image (operation 1102). Geo-registering the current image includes, for example, identifying the relationships between the coordinates in the image and the coordinates on map images.

Operation 1102 may be performed using any number of algorithms and techniques for geo-registering, such as, for example, without limitation, a precision image registration (PIR) algorithm. Further, operation 1102 may also be performed using, for example, at least one of information provided by the sensor system generating the video data, information about the sensor platform on which the sensor system is located, map images in a map database, satellite images in a satellite imagery database, and/or other suitable types of information.

The process then identifies features for a number of objects in the current image (operation 1104). These features may be, for example, components of the object. Some of these features may be identified using the track information formed in operation 1006 in FIG. 10.

Thereafter, the process classifies the number of objects in the current image using the features identified (operation 1106). For example, in operation 1106, an object may be classified as one of a vehicle, a person, a manmade structure, or some other suitable type of object.

The process then identifies parameters for the number of objects to form object information (operation 1108). In operation 1108, these parameters may include, for example, without limitation, at least one of a location, a size, a shape, an orientation, a color, and/or other suitable information about an object in the number of objects.

Next, the process represents the object information for the number of objects in data in a compressed form (operation 1110). The process then places the data in the compressed form into a data stream for transmission over a wireless communications link (operation 1112). The process then determines whether any additional images are present in the sequence of images (operation 1114). If additional images are not present, the process terminates. Otherwise, the process returns to operation 1100 as described above, with the process selecting a next image in the sequence of images as the current image for processing.

Figure 12:
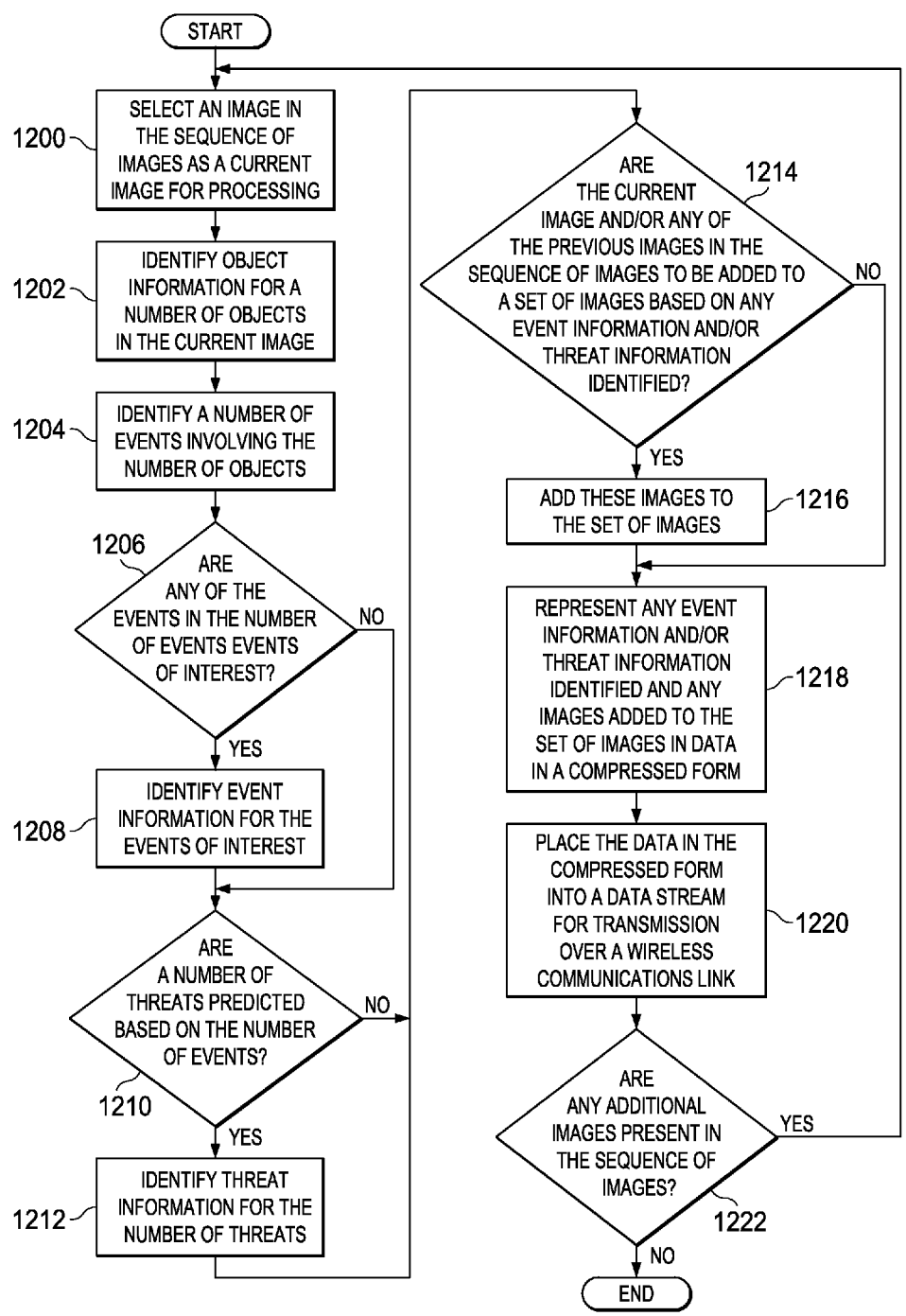
FIG. 12 is an illustration of a flowchart of a process for compressing video information in accordance with an advantageous embodiment.

With reference now to FIG. 12, an illustration of a flowchart of a process for compressing video information is depicted in accordance with an advantageous embodiment. The process illustrated in FIG. 12 may be implemented in image processing module 204 in FIG. 2. In particular, this process describes one manner in which sequence of images 210 in FIG. 2 may be processed using third level 234 from different levels of reduction of data 224 in FIG. 2.

The process begins by selecting an image in the sequence of images as a current image for processing (operation 1200). The process then identifies object information for a number of objects in the current image (operation 1202). In operation 1202, the object information may be identified by performing operations 1102-1108 in FIG. 11.

Thereafter, the process identifies a number of events involving the number of objects (operation 1204). Identifying the number of events may include using the object information, track information for the number of objects, the current image, and/or previous images in the sequence of images that have been generated by the camera system. In these examples, an event is a change in the relationship between two or more objects occurring over time.

The process determines whether any of the events in the number of events are events of interest (operation 1206). For example, an unscheduled delivery of a crate to a private location may be an event of interest. If any of the events are events of interest, the process identifies event information for the events of interest (operation 1208).

Thereafter, the process determines whether a number of threats are predicted based on the number of events identified in operation 1204 (operation 1210). If a number of threats are predicted, the process identifies threat information for the number of threats (operation 1212). The process then determines whether the current image and/or any of the previous images in the sequence of images are to be added to a set of images based on any event information and/or threat information identified (operation 1214).

If the current image and/or any of the previous images in the sequence of images are to be added to the set of images, the process adds these images to the set of images (operation 1216). The process then represents any event information and/or threat information identified and any images added to the set of images in data in a compressed form (operation 1218). The data in the compressed form is placed into a data stream for transmission over a wireless communications link (operation 1220).

The process then determines whether any additional images are present in the sequence of images (operation 1222). If additional images are not present, the process terminates. Otherwise, the process returns to operation 1200 as described above, with the process selecting a next image in the sequence of images as the current image for processing.

With reference again to operation 1214, if no images are to be added to set of images, the process proceeds to operation 1218 as described above. With reference again to operation 1210, if no threats are predicted, the process proceeds to operation 1214 as described above. Further, with reference again to operation 1206, if no events in the number of events are events of interest, the process proceeds to operation 1210 as described above.

Figure 13:
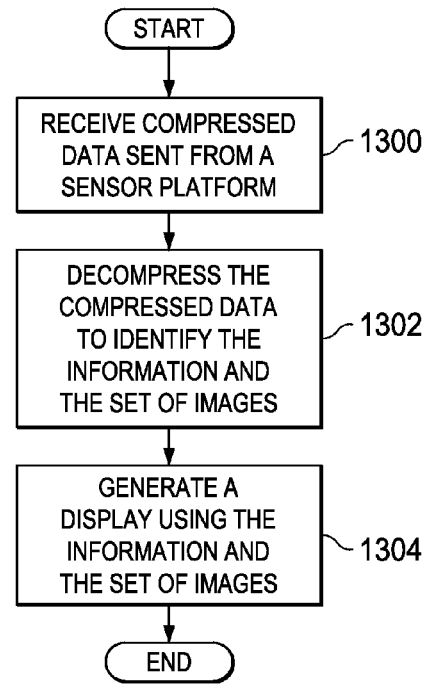
FIG. 13 is an illustration of a flowchart of a process for processing compressed data received from a sensor platform in accordance with an advantageous embodiment.

With reference now to FIG. 13, an illustration of a flowchart of a process for processing compressed data received from a sensor platform is depicted in accordance with an advantageous embodiment. The process illustrated in FIG. 13 may be implemented in information processing module 304 in FIG. 3.

The process begins by receiving compressed data sent from a sensor platform (operation 1300). The compressed data may be received over a wireless communications link in this illustrative example. The compressed data represents information identified from images generated by a sensor system on the sensor platform and a set of the images generated.

The process then decompresses the compressed data to identify the information and the set of images (operation 1302). In operation 1302, this decompression may be performed using currently-available techniques. Thereafter, the process generates a display using the information and the set of images (operation 1304), with the process terminating thereafter.

Figure 14:
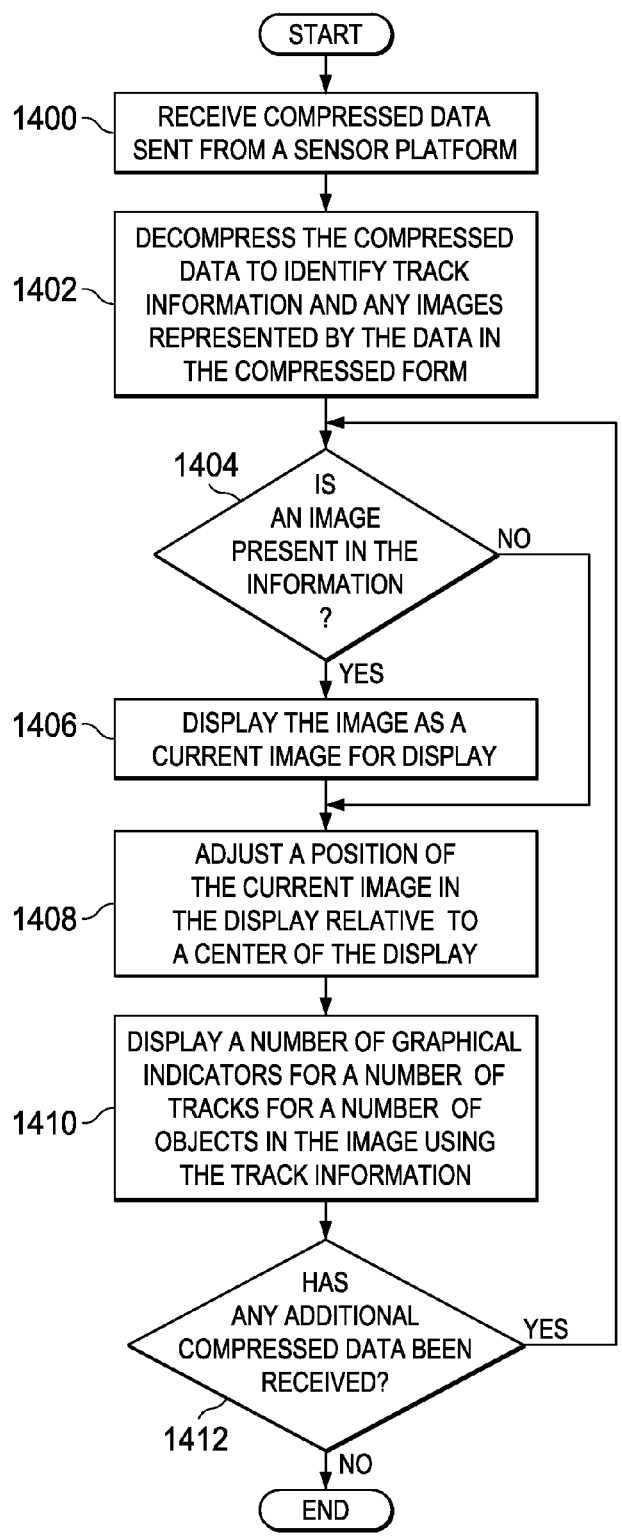
FIG. 14 is an illustration of a flowchart of a process for processing compressed data received from a sensor platform in accordance with an advantageous embodiment.

With reference now to FIG. 14, an illustration of a flowchart of a process for processing compressed data received from a sensor platform is depicted in accordance with an advantageous embodiment. The process illustrated in FIG. 14 may be implemented in information processing module 304 in FIG. 3.

The process begins by receiving compressed data sent from a sensor platform (operation 1400). This compressed data is generated by the sensor platform using a first level of reduction of data, such as first level 230 from different levels of reduction of data 224 in FIG. 2. Further, this compressed data may be the data generated in the compressed form in operation 1012 in FIG. 10. The process decompresses the compressed data to identify track information and any images represented by the data in the compressed form (operation 1402).

Thereafter, the process determines whether an image is present in the information (operation 1404). If an image is present, the process displays the image as a current image for display (operation 1406). The process then adjusts a position of the current image in the display relative to a center of the display (operation 1408).

In particular, in operation 1408, the process adjusts a position and orientation of the image such that the center of the display corresponds to the center of view of a camera on the sensor platform at a current displayed frame time. The current displayed frame time corresponds to a time at which an image was generated by the camera. As a result, the image may be offset, rotated, and/or skewed relative to the center of the display. This placement of the image may be to provide a more intuitive view for an operator viewing images at a frame rate that is lower than 30 frames per second.

Thereafter, the process displays a number of graphical indicators for a number of tracks for a number of objects in the image using the track information (operation 1410). In these illustrative examples, one track is present for each object. In operation 1410, the display of the number of graphical indicators may track movement of the number of objects over time.

The process then determines whether any additional compressed data has been received (operation 1412). If additional compressed data has not been received, the process terminates. Otherwise, the process returns to operation 1404 as described above.

With reference again to operation 1404, if an image is not present in the information, the process proceeds to operation 1408 as discussed above.

Figure 15:
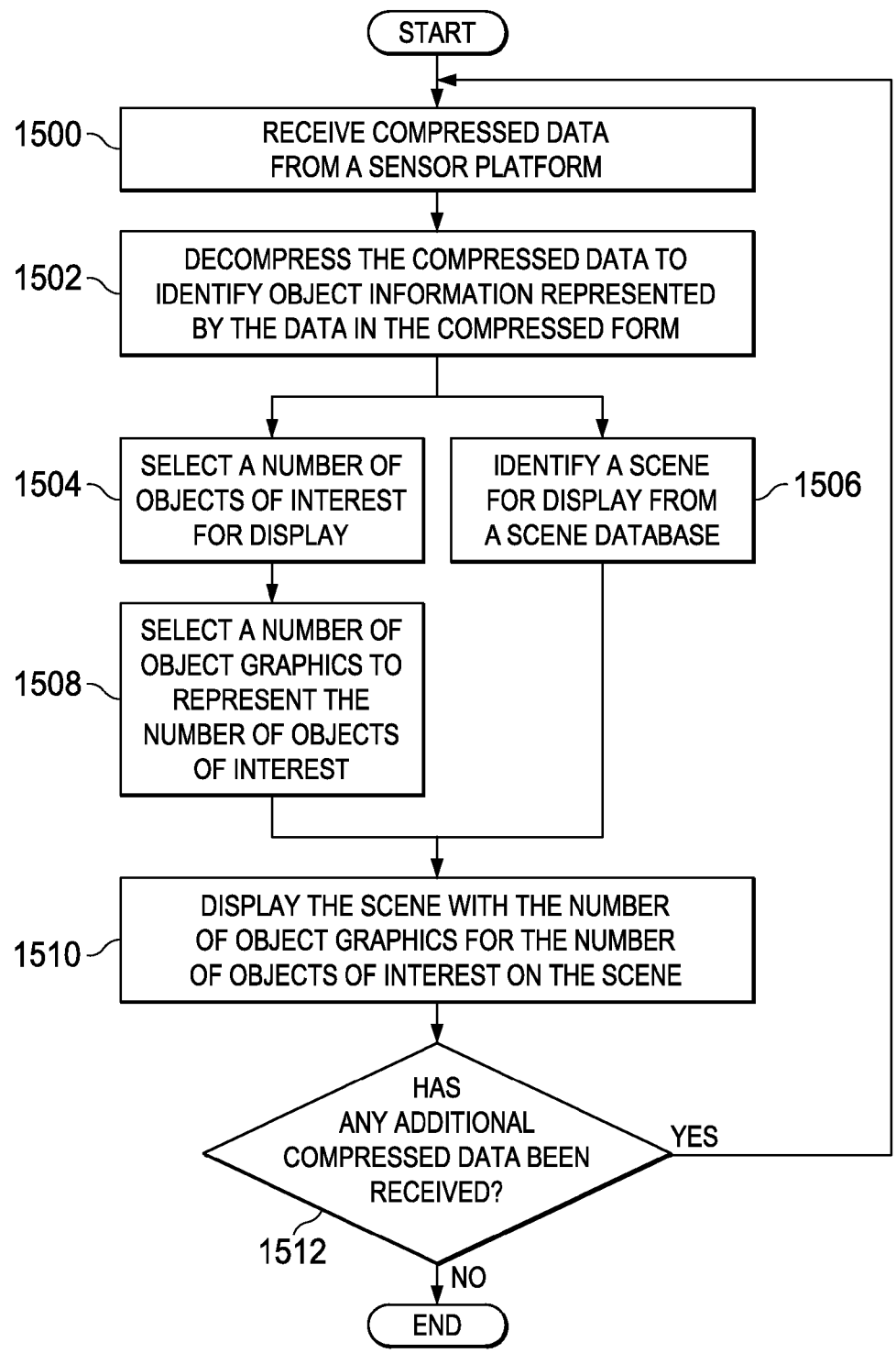
FIG. 15 is an illustration of a flowchart of a process for processing compressed data received from a sensor platform in accordance with an advantageous embodiment.

With reference now to FIG. 15, an illustration of a flowchart of a process for processing compressed data received from a sensor platform is depicted in accordance with an advantageous embodiment. The process illustrated in FIG. 15 may be implemented in information processing module 304 in FIG. 3.

The process begins by receiving compressed data from a sensor platform (operation 1500). This compressed data is generated by the sensor platform using a second level of reduction of data, such as second level 232 from different levels of reduction of data 224 in FIG. 2. This compressed data may be the data generated in the compressed form in operation 1110 in FIG. 11. The process decompresses the compressed data to identify object information represented by the data in the compressed form (operation 1502).

The process then selects a number of objects of interest for display using the object information (operation 1504), while also identifying a scene for display from a scene database (operation 1506). The scene may be, for example, a representation of a scene in an image in which the number of objects is present. In operation 1506, the process may search a scene database, such as scene database 314 in FIG. 3, for the scene.

After operation 1504, the process selects a number of object graphics to represent the number of objects of interest (operation 1508). In operation 1508, the number of object graphics may include, for example, images, models, shapes, symbols, and/or other suitable types of representations for the number of objects of interest. The object graphics may be obtained from an object database, such as object database 312 in FIG. 3.

After operation 1506 and operation 1508, the process displays the scene with the number of object graphics for the number of objects of interest on the scene (operation 1510). The process then determines whether any additional compressed data has been received (operation 1512). If additional compressed data has been received, the process returns to operation 1500 as described above. Otherwise, the process terminates.

Figure 16:
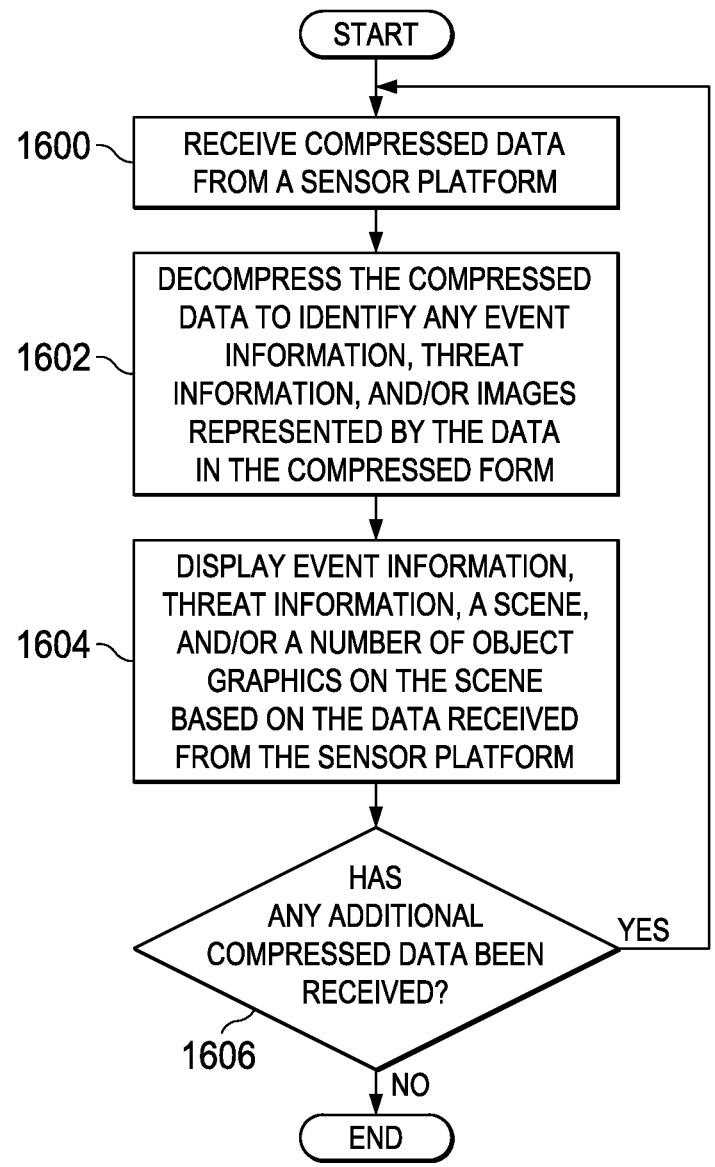
FIG. 16 is an illustration of a flowchart of a process for processing compressed information in accordance with an advantageous embodiment.

With reference now to FIG. 16, an illustration of a flowchart of a process for processing compressed information is depicted in accordance with an advantageous embodiment. The process illustrated in FIG. 16 may be implemented in information processing module 304 in FIG. 3.

The process begins by receiving compressed data sent from a sensor platform (operation 1600). This compressed data is generated by the sensor platform using a third level of reduction of data, such as third level 234 from different levels of reduction of data 224 in FIG. 2. Further, this compressed data may be the data generated in the compressed form in operation 1218 in FIG. 12. The process decompresses the compressed data to identify any event information, threat information, and/or images represented by the data in the compressed form (operation 1602).

Thereafter, the process displays event information, threat information, a scene, and/or a number of object graphics on the scene based on the data received from the sensor platform (operation 1604). The process then determines whether any additional compressed data has been received (operation 1606). If additional compressed data has been received, the process returns to operation 1600 as described above. Otherwise, the process terminates.

The flowcharts and block diagrams in the different depicted advantageous embodiments illustrate the architecture, functionality, and operation of some possible implementations of apparatuses and methods in different advantageous embodiments. In this regard, each block in the flowcharts and/or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts and/or block diagrams.

In some alternative implementations, the function or functions noted in the block may occur out of the order noted in the figures. For example, in some cases, two blocks shown in succession may be executed substantially concurrently or the blocks may sometimes be executed in the reverse order, depending upon the functionality involved. Also, other blocks may be added in addition to the illustrated blocks in a flowchart and/or block diagram.

Turning now to FIG. 17, an illustration of a data processing system is depicted in accordance with an advantageous embodiment. Data processing system 1700 is an example of components that may be used to implement various devices in the different advantageous embodiments. For example, data processing system 1700 may be used to implement one or more of computer systems 103, 104, and 105 in FIG. 1. Data processing system 1700 may also be used to implement image processing module 204 in FIG. 2 and information processing module 304 in FIG. 3.

In this illustrative example, data processing system 1700 includes communications fabric 1702, which provides communications between processor unit 1704, memory 1706, persistent storage 1708, communications unit 1710, input/output (I/O) unit 1712, and display 1714.

Processor unit 1704 serves to execute instructions for software that may be loaded into memory 1706. Processor unit 1704 may be a number of processors, a multi-processor core, or some other type of processor, depending on the particular implementation. A "number", as used herein with reference to an item, means "one or more items." Further, processor unit 1704 may be implemented using a number of heterogeneous processor systems in which a main processor is present with secondary processors on a single chip. In another illustrative example, processor unit 1704 may be a symmetric multi-processor system containing multiple processors of the same type.

Memory 1706 and persistent storage 1708 are examples of storage devices 1716. A storage device is any piece of hardware that is capable of storing information, such as, for example, without limitation, data, program code in functional form, and/or other suitable information either on a temporary basis and/or a permanent basis. Storage devices 1716 may also be referred to as computer readable storage devices in these examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 may also be removable. For example, a removable hard drive may be used for persistent storage 1708.

Communications unit 1710, in these examples, provides for communications with other data processing systems or devices. In these examples, communications unit 1710 is a network interface card. Communications unit 1710 may provide communications through the use of either or both physical and wireless communications links.

Input/output unit 1712 allows for input and output of data with other devices that may be connected to data processing system 1700. For example, input/output unit 1712 may provide a connection for user input through a keyboard, a mouse, and/or some other suitable input device. Further, input/output unit 1712 may send output to a printer. Display 1714 provides a mechanism to display information to a user.

Instructions for the operating system, applications, and/or programs may be located in storage devices 1716, which are in communication with processor unit 1704 through communications fabric 1702. These instructions may be loaded into memory 1706 for execution by processor unit 1704. The processes of the different embodiments may be performed by processor unit 1704 using computer implemented instructions, which may be located in a memory, such as memory 1706.

These instructions are referred to as program code, computer usable program code, or computer readable program code that may be read and executed by a processor in processor unit 1704. The program code in the different advantageous embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these examples. In one example, computer readable media 1720 may be computer readable storage media 1724 or computer readable signal media 1726.

Computer readable storage media 1724 may include, for example, an optical or magnetic disk that is inserted or placed into a drive or other device that is part of persistent storage 1708 for transfer onto a storage device, such as a hard drive, that is part of persistent storage 1708. Computer readable storage media 1724 may also take the form of a persistent storage, such as a hard drive, a thumb drive, or a flash memory, that is connected to data processing system 1700.

In some instances, computer readable storage media 1724 may not be removable from data processing system 1700. In these examples, computer readable storage media 1724 is a physical or tangible storage device used to store program code 1718 rather than a medium that propagates or transmits program code 1718. Computer readable storage media 1724 is also referred to as a computer readable tangible storage device or a computer readable physical storage device.

The different components illustrated for data processing system 1700 are not meant to provide architectural limitations to the manner in which different advantageous embodiments may be implemented. The different advantageous embodiments may be implemented in a data processing system including components in addition to or in place of those illustrated for data processing system 1700. Other components shown in FIG. 17 can be varied from the illustrative examples shown. The different advantageous embodiments may be implemented using any hardware device or system capable of running program code. In one example, the data processing system may include organic components integrated with inorganic components and/or may be comprised entirely of organic components excluding a human being. For example, a storage device may be comprised of an organic semiconductor.

In another illustrative example, processor unit 1704 may take the form of a hardware unit that has circuits that are manufactured or configured for a particular use. This type of hardware may perform operations without needing program code to be loaded into a memory from a storage device to be configured to perform the operations.

For example, when processor unit 1704 takes the form of a hardware unit, processor unit 1704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and/or other suitable hardware devices. With this type of implementation, program code 1718 may be omitted, because the processes for the different advantageous embodiments are implemented in a hardware unit.

In still another illustrative example, processor unit 1704 may be implemented using a combination of processors found in computers and hardware units. Processor unit 1704 may have a number of hardware units and a number of processors that are configured to run program code 1718. In this depicted example, some of the processes may be implemented in the number of hardware units, while other processes may be implemented in the number of processors.

In another example, a bus system may be used to implement communications fabric 1702 and may be comprised of one or more buses, such as a system bus or an input/output bus. Of course, the bus system may be implemented using any suitable type of architecture that provides for a transfer of data between different components or devices attached to the bus system.

Thus, the different advantageous embodiments provide a method and apparatus for processing images. In one advantageous embodiment, a sequence of images is received from a sensor system. A number of objects are present in the sequence of images. Information about the number of objects is identified using the sequence of images and a selection of a level of reduction of data. A set of images from the sequence of images is identified using the selection of the level of reduction of data. The set of images and the information about the number of objects are represented in data. An amount of the data for the sequence of images is based on the selection of the level of reduction of data.

In this manner, the different advantageous embodiments provide a system for extracting relevant information from images such that the amount of data sent over wireless communications links may be reduced. This reduction allows an increased amount of bandwidth to be available for these wireless communications links.

The description of the different advantageous embodiments has been presented for purposes of illustration and description and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. A method for processing images, the method comprising:
  receiving, by a sensor platform comprising a sensor system, a sequence of images from the sensor system;
  recognizing a number of objects in the sequence of images;
  identifying, by the sensor platform, object information about the number of objects in the sequence of images;
  identifying a number of threats from within the number of objects;
  receiving a selection of a level of reduction of data from different levels of reduction of data; and
  generating data, by the sensor platform, using the selection of the level of reduction of data,
  wherein, an amount of the data is based on the selection of the level of reduction of data;
  wherein, the different levels of reduction of data comprise a first level of reduction, a second level of reduction, and a third level of reduction;
  wherein, when the first level of reduction is selected, the data comprises a set of images selected from a number of images in the sequence of images that is less than the number of images in the sequence of images, such that the set of images are selected based on an overlap between images in the set of images and a reference image;
  wherein, when the second level of reduction is selected, the data comprises no images from the sequence of images and the object information; and
  wherein, when the third level of reduction is selected, the data comprises no images from the sequence of images and object information only for the number of threats identified within the number of objects.

2. The method of claim 1 further comprising:
  sending the data for the sequence of images from the sensor platform to another platform using a wireless communications link, wherein a bandwidth used in the wireless communications link for sending the data representing the information about the number of objects and the set of images is less than the bandwidth needed for sending the data representing all of the sequence of images.

3. The method of claim 1, wherein the step of identifying the information about the number of objects comprises:
  identifying track information for the number of objects using the sequence of images, wherein the track information describes movement of the number of objects in a scene present in the sequence of images.

4. The method of claim 3, wherein the step of identifying the information about the number of objects further comprises:
  identifying object information for the number of objects using at least one of the track information and the sequence of images, wherein the object information describes the number of objects present in the scene in the sequence of images.

5. The method of claim 4, wherein the step of identifying the information about the number of objects further comprises:
  identifying a number of events that occur in the scene using the sequence of images; and
  identifying event information for the number of events using at least one of the track information, the object information, and the sequence of images, wherein the event information is for a number of events of interest in the number of events.

6. The method of claim 5, wherein the step of identifying the information about the number of objects further comprises:
  determining whether a number of threats are predicted based on the number of events identified; and
  responsive to a determination that the number of threats is predicted based on the number of events identified, identifying threat information for the number of threats.

7. The method of claim 1, wherein the step of identifying the set of images from the sequence of images comprises:
  determining whether the overlap between a current image in the sequence of images and the reference image in the sequence of images is less than a selected threshold; and
  responsive to a determination that the overlap is less than the selected threshold, adding the current image to the set of images.

8. The method of claim 1 further comprising:
  receiving user input selecting the level of reduction of data from the different levels of reduction of data.

9. The method of claim 1 further comprising:
  sending the data to a platform using a wireless communications link, wherein an average data rate used for sending the data for the sequence of images is reduced when a higher level of reduction of data is selected from the different levels of reduction of data as compared to when a lower level of reduction of data is selected from the different levels of reduction of data.

10. The method of claim 1 further comprising:
  receiving the data;
  identifying the information and the set of images represented in the data; and
  displaying the information and the set of images on a display on a display device.

11. The method of claim 10, wherein the step of displaying the information and the set of images on the display on the display device comprises:
  displaying a current image in the set of images; and
  displaying a number of tracks for the number of objects, wherein each track in the number of tracks indicates a current position and a direction of movement for an object in the number of objects.

12. The method of claim 10, wherein the set of images is a null set wherein the step of displaying the information and the set of images on the display on the display device comprises:
  displaying a scene on the display on the display device; and
  displaying a number of object graphics on the scene using object information in the information.

13. The method of claim 10, wherein the set of images is a null set wherein the step of displaying the information and the set of images on the display on the display device comprises:
  displaying at least one of event information, threat information, a scene, and a number of object graphics on the display on the display device using the information.

14. The method of claim 2, further comprising:
  sending, by the sensor platform, the information about the number of objects instead of sending the sequence of images to a platform;
  wherein the sensor platform is one of an unmanned aerial vehicle and an unmanned ground vehicle; and wherein the platform is a ground station configured to receive and process the data from the sensor platform.

15. The method of claim 14,
wherein when the first level of reduction is selected, the data comprises representations of the set of images and the information about the number of objects;
wherein when a third level of reduction is selected, the set of images represented in the data is a null set and the information about the number of objects relates to objects involved in one or more of number of events of interest described in event information and number of threats described in threat information; and
wherein an amount of data related to the third level of reduction is less than an amount of data related to the second level of reduction.

16. The method of claim 7, further comprising:
measuring the overlap by aligning the current image and the reference image such that one or more features in the current image and the reference image substantially match.

17. The method of claim 1, wherein the data further includes platform meta-data, wherein the platform meta-data comprises a route for the sensor platform.

18. An apparatus comprising:
an image processing module of a sensor platform comprising a sensor system, the image processing module configured to:
  receive a sequence of images from the sensor system;
  recognize a number of objects in the sequence of images;
  identify object information about the number of objects in the sequence of images;
  identify a number of threats from within the number of objects;
  receive a selection of a level of reduction of data from different levels of reduction of data; and
  generate data using the selection of the level of reduction of data,
wherein an amount of the data is based on the selection of the level of reduction of data;
wherein the different levels of reduction of data comprise a first level of reduction, a second level of reduction, and a third level of reduction;
wherein, when the first level of reduction is selected, the data comprises a set of images selected from a number of images in the sequence of images that is less than the number of images in the sequence of images, such that the set of images are selected based on an overlap between images in the set of images and a reference image;
wherein, when the second level of reduction is selected, the data comprises no images from the sequence of images and the object information; and
wherein, when the third level of reduction is selected, the data comprises no images from the sequence of images and object information only for the number of threats identified with the number of objects.

19. The apparatus of claim 18 further comprising:
a communications system of the sensor platform, the communications system configured to send the data for the sequence of images from the sensor platform to another platform using a wireless communications link, wherein a bandwidth used in the wireless communications link for sending the data representing the information about the number of objects and the set of images is less than the bandwidth needed for sending the data representing all of the sequence of images and wherein the communications system, the sensor system, and the image processing module are in a sensor platform.

20. The apparatus of claim 18, wherein in being configured to identify the information about the number of objects, the image processing module is configured to identify at least one of track information for the number of objects, object information for the number of objects, event information for a number of events of interest identified using the sequence of images, and threat information for a number of threats predicted based on a number of events identified using the sequence of images.

21. The apparatus of claim 19, wherein in being configured to identify the set of images, the image processing module is configured to determine whether the overlap between a current image in the sequence of images and the reference image in the sequence of images is less than a selected threshold; and add the current image to the set of images in response to a determination that the overlap is less than the selected threshold.

22. A method for processing images, the method comprising:
receiving, by a sensor platform comprising a sensor system, a sequence of images from the sensor system;
forming compressed data from the sequence of images based on a selection of one of a first level of data reduction, a second level of data reduction, and a third level of data reduction;
sending the compressed data by the sensor platform to a platform;
wherein a number of objects is present in the sequence of images;
wherein when the first level of data reduction is selected, the compressed data comprises track information and one or more images;
wherein when the second level of data reduction is selected, the compressed data comprises a null set of images, the track information, and object information;
wherein when the third level of data reduction is selected, the compressed data comprises the null set of images, the track information, the object information, event information, and threat information;
wherein the track information:
  is identified from the sequence of images,
  describes movement of the number of objects, and
  includes, for each object of the number of objects, a previous location, a current location, a direction of travel, a speed, a size, and a color;
wherein the object information:
  is identified from the sequence of images and the track information,
  describes the number of objects, and
  includes for each object of the number of objects, an identification of the object, a type of the object, a color the object, dimensions for the object, and a shape of the object;
wherein the event information:
  is identified from the sequence of images, the track information, and the object information,
  describes a number of events of interest, and
  includes, for each event of interest of the number of events of interest, an identification of the event of interest, a list of objects in the number of objects involved in the event of interest, a location of the event of interest, a start time for the event of interest, a duration of the event of interest, and information about events that lead up to the event of interest;

wherein the threat information:
  includes a number of threats predicted based on the number of events,
  is identified from the sequence of images, the track information, the object information, and the event information, and
  includes for each threat of the number of threats, an identification of the threat, a list of events in the number of events that contribute to a prediction of the threat, event information identified for events contributing to prediction of the threat, a list of objects in the number of objects involved in the threat;
wherein the sensor platform is an unmanned aerial vehicle; and
wherein the platform is a ground station.

23. A method for processing images, the method comprising:
  receiving, by a sensor platform comprising a sensor system, a sequence of images from the sensor system;
  receiving a selection of a level of reduction of data selected from one of: a first level of reduction, a second level of reduction, and a third level of reduction;
  determining, by the sensor platform, whether an overlap between a current image in the sequence of images and a reference image in the sequence of images is less than a selected threshold, and responsive to a determination that a determination that the overlap is less than the selected threshold, adding the current to a set of images such that the set of images selected is less than a number of images in the sequence of images, when the first level of reduction is selected;
  identifying, by the sensor platform, object information about a number of objects in the sequence when the second of level of reduction is selected;
  identifying, by the sensor platform, threat information in the number of objects in the sequence of images when the third level of reduction is selected; and
  sending one or more of the set of images, the object information, or the threat information to another platform.

24. The method of claim 23, further comprising:
  displaying, on a display device, the set of images a number of tracks for the number of objects, wherein each track in the number of tracks indicates a current position and a direction of movement for an object in the number of objects.

* * * * *